United States Patent
Pritchard

(10) Patent No.: US 11,405,490 B2
(45) Date of Patent: Aug. 2, 2022

(54) SMART DATA TRANSMISSION PROTOCOL OPTIMIZED FOR SPEED AND IMPORTANCE

(71) Applicants: KONINKLIJKE PHILIPS N.V., Eindhoven (NL); REMOTE DIAGNOSTIC TECHNOLOGIES LIMITED, Basingstoke (GB)

(72) Inventor: Nigel Pritchard, Southampton (GB)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 17/286,249

(22) PCT Filed: Oct. 28, 2019

(86) PCT No.: PCT/EP2019/079312
§ 371 (c)(1),
(2) Date: Apr. 16, 2021

(87) PCT Pub. No.: WO2020/089130
PCT Pub. Date: May 7, 2020

(65) Prior Publication Data
US 2021/0352164 A1    Nov. 11, 2021

(30) Foreign Application Priority Data
Oct. 31, 2018   (GB) .................................... 1817817

(51) Int. Cl.
*H04L 69/164* (2022.01)
*H04L 47/24* (2022.01)
(Continued)

(52) U.S. Cl.
CPC .......... *H04L 69/164* (2013.01); *H04L 47/245* (2013.01); *H04L 67/322* (2013.01); *H04L 69/326* (2013.01)

(58) Field of Classification Search
CPC ... H04L 69/164; H04L 47/245; H04L 67/322; H04L 69/326
See application file for complete search history.

(56) References Cited

U.S. PATENT DOCUMENTS 6,076,114 A    6/2000   Wesley
6,438,603 B1   8/2002   Ogus
(Continued)

FOREIGN PATENT DOCUMENTS

CN    101572596 A    11/2009
GB      2552201 A     1/2018
(Continued)

OTHER PUBLICATIONS

PCT/EP2019/079312 ISR & Written Opinion, dated Jan. 7, 2020, 14 Pages.
(Continued)

*Primary Examiner* — Mohamed A. Wasel

(57) ABSTRACT

A method of transmitting data between a first computer and a second computer. The method involves the first computers obtaining data for transmission to the second computer, the data including a first type of data and a second type of data. Each type of data has an associated transmission priority, the first type of data has a receipt requirement and the second type of data does not have a receipt requirement. The method further involves the first computer buffering the obtained data in buffer(s), reading the data from the buffer(s) and transmitting the data to the second computer according to the transmission priorities. For the first type of data, the first computer determine, by reference to an expected acknowledgement message from the second computer, whether the transmitted data has been received by the second computer and, if it is determined not to have been received, retransmitting the data to the second computer.

25 Claims, 12 Drawing Sheets

(51) Int. Cl.
    *H04L 67/61*         (2022.01)
    *H04L 69/326*      (2022.01)

(56) References Cited

U.S. PATENT DOCUMENTS

| | | |
|---|---|---|
| 8,908,654 B2 | 12/2014 | Proctor |
| 8,970,392 B2 | 3/2015 | Lalonde et al. |
| 2002/0191614 A1 | 12/2002 | Ido |
| 2003/0018793 A1 | 1/2003 | Mora |
| 2009/0062887 A1 | 3/2009 | Mass |
| 2015/0117465 A1 | 4/2015 | Hamada |
| 2018/0020040 A1 | 1/2018 | Ruellan |
| 2018/0302189 A1 | 10/2018 | Harrod |
| 2019/0208041 A1* | 7/2019 | Jaganathan ........... H04L 1/1607 |

FOREIGN PATENT DOCUMENTS

| | | |
|---|---|---|
| JP | 2007072886 A | 3/2007 |
| WO | 9851052 A1 | 11/1998 |
| WO | 2011145557 A1 | 11/2011 |

OTHER PUBLICATIONS

Bova et al: "Reliable UDP Protocol"; Cisco Systems, Internet Draft, Feb. 1999, 17 Page Document.

\* cited by examiner

SMART DATA TRANSMISSION PROTOCOL OPTIMIZED FOR SPEED AND IMPORTANCE

CROSS-REFERENCE TO PRIOR APPLICATIONS

This application is the U.S. National Phase application under 35 U.S.C. § 371 of International Application No. PCT/EP2019/079312, filed on Oct. 28, 2019, which claims the benefit of Great Britain Application No. 1817817.8, filed on Oct. 31, 2018. These applications are hereby incorporated by reference herein.

TECHNICAL FIELD

The present invention relates to a method transmitting data between a first computer and a second computer.

BACKGROUND

Devices for medically monitoring patients, for example in the field, outside of an institutional medical establishment, are known. For example, Remote Diagnostic Technologies Ltd manufactures and sells such a device, called the Tempus Pro™. Such devices generally may be used to monitor a patient and collect vital sign data using one or more medical sensors that are coupled to the device. A benefit of such a device is that it can be deployed remotely to the scene of an accident, for example. Ambulance vehicles may have one or more of these devices on board to allow paramedics to provide aid to patients. An example device may allow a patient's blood pressure, temperature, and heart-rate to be monitored.

Medical data gathered by the device can be transmitted to other medical devices and/or to a remote server for storage and/or further processing. For example, a telemedicine application may access the medical data stored on the remote server. This data can provide hospital personnel with patient medical data before the patient arrives at the hospital. These medical devices can be located in remote locations where data connectivity is unreliable. For example, the connection may be intermittent, suffer high data loss, and have low bandwidth. Thus, the connection should be used efficiently to ensure the maximum amount of data can be transmitted.

Protocols are known for transmitting data over a network. For example, the Transmission Control Protocol (TCP) provides reliable delivery of data between two computers. Data that is lost during transmission is retransmitted. Data that does not require reliable delivery can be sent using the User Datagram Protocol (UDP). Sending data using UDP is faster, but is unreliable because there is no guarantee the data will be received. Conversely, sending data using TCP is slower, due to the added overhead incurred in ensuring reliable receipt. TCP also does not perform well when the underlying network has high loss and delay.

Some users therefore use TCP regardless of whether the specific data being transmitted requires reliable receipt. However, such a regime is an inefficient use of bandwidth because some data may be retransmitted even if it is not important. UDP is more efficient, but is often not used because important data can be lost.

SUMMARY

Some users will use both UDP and TCP, and select between these two protocols depending upon the type of data being sent at that time. However, using two protocols separately means that a user loses control over priority and ordering because the two protocols act independently of each other. Accordingly, what is needed is a more reliable protocol which overcomes these problems.

According to a first aspect of the present invention, there is provided a method of transmitting data between a first computer and a second computer, the method comprising:

obtaining, by the first computer, data for transmission to the second computer, the data comprising at least first data and second data, the first data being of a first type of data and the second data being of a second type of data, each type of data having an associated transmission priority, and the first type of data having a receipt requirement whereby the data is required to be received by the second computer and the second type of data not having a receipt requirement;

buffering the obtained data in one or more buffers;

reading the data from the one or more buffers and transmitting the data to the second computer according to the transmission priorities; and for only transmitted data having a receipt requirement whereby the data is required to be received by the second computer, determining, by the first computer by reference to an expected acknowledgement message from the second computer, whether the transmitted data has been received by the second computer and, if it is determined not to have been received, retransmitting the data to the second computer.

Unlike with known protocols, which may be optimised for speed (such as UDP) or importance (such as TCP), the present method accommodates efficient transmission of data having varying combinations of each kind of attribute (speed and importance) using a single protocol. The method achieves this using prioritisation, for instance to ensure data that is most urgent is transmitted first, and a receipt requirement attribute, for instance to determine whether or not respective data needs to be received (and, if not, needs to be re-transmitted). The method conveniently also accommodates data having both (speed and importance) attributes. This results in an efficient use of bandwidth, without loss of control. Because the above method handles priority and retransmission, it allows the data to be sent using a single protocol that does not guarantee reliable receipt, such as UDP. For example, the above method controls the order in which data is sent using UDP. UDP is therefore unaware that it may be retransmitting data because retransmission is handled by the above method. This method is therefore advantageous over existing systems in which two or more protocols, such as UDP and TCP, are used in parallel.

In an example, all data being sent by the first computer has an associated transmission priority which is determined based on the type of data. Thus, the type of data indicates the associated transmission priority. Similarly, all data being sent by the first computer either requires reliable receipt or does not require reliable receipt. This again is determined based on the type of data. Data of one or more data types is therefore obtained by the first computer. The data can then be buffered and transmitted according to the transmission priorities. Data that requires reliable receipt is retransmitted if the data is not received by the second computer, or if the data is not acknowledged by the second computer. Data that does not require reliable receipt is not retransmitted even if it is not received by the second computer.

Transmission priorities may include low priority and high priority, or low priority, medium priority and high priority, for example. There may any number of transmission priority levels.

The first computer may be a device for medically monitoring a patient, for example. The second computer may be a remote server or another device. An operator of the first computer may use the first computer, or other equipment communicatively coupled to the computer, to generate/record/measure/obtain different types data. For example, the operator may attach a sensor to a patient in order to measure heart rate, blood pressure etc. The operator may enter data into the first computer via an I/O device, such as a keyboard, camera, or microphone.

Types of data being transmitted to the second computer may include: medical/patient data, device data, connection data, security data, etc. The data itself may indicate its type of data. For example, metadata within the data may be read to determine the type of data obtained.

Medical/patient data can include data that is being generated or recorded in real time, such as patient heart rate. Medical/patient data can also include non-real time data, such as average heart rate, blood pressure, patent age, name, address etc. Device data can include a device serial number, device name, operator name, etc. Connection data can include data used to start or end a communication session, such as a start/disconnect message. Security data may include data relating to usernames, passwords, etc.

As mentioned, these types of data are associated with a transmission priority level. For example, connection data may be prioritised above average heart rate data. Similarly, these types of data either require reliable receipt, or do not require reliable receipt. For example, real-time data may not require reliable receipt, and connection and security data may require reliable receipt. As can be seen, the transmission priority level and receipt requirements are specific to the data. These may be set by a device manufacturer, a user, or an administrator, for example.

In some examples, the expected acknowledgement message is never received by the first computer. Accordingly, the first computer may assume/infer that the transmitted data was not received by the second computer. In other examples, the expected acknowledgement is received. The acknowledgement message may indicate that the transmitted element of data was not received by the second computer.

"Obtaining, by the first computer, data for transmission" can include receiving data from another device/instrument/sensor and/or generating data within the first computer. "Buffering the obtained data" includes storing or writing the obtained data. "reading the data" includes copying, moving or transferring the data.

The method may further comprise:
obtaining, by the first computer, third data, the third data being of the first type of data;
buffering the third data in the one or more buffers;
determining that the first data was not received by the second computer;
and responsively:
updating the transmission priority of the first data to a level that is higher than that of the third data; and
retransmitting the first data to the second computer before transmitting the third data to the second computer.

Accordingly, if an element of data requires retransmission, it is prioritised above an element of data that is of the same type (ordinarily, these elements of data would have the same priority level). As such, data that requires retransmission is prioritised over data that has not yet been sent. This ensures that data is received by the second computer as soon as possible.

The method may further comprise:
for data having a receipt requirement whereby the data is required to be received by the second computer:
determining that plural elements of data have not been acknowledged by the second computer within a threshold period of time; and
retransmitting the most recently transmitted element of data of the plural elements of data.

An element of data may also be known as a chunk of data, and these terms may be used interchangeably. For example, multiple elements of data may have been sent in a period of time, but none of them have been acknowledged. For example, a timer may begin as a first element of data is transmitted, and after a threshold period of time, the first element of data may not have been acknowledged. In this period, several more elements of data will have been transmitted, which too may not have been acknowledged. This situation may occur because of a failed connection where the data being sent was lost during transmission, or because of the acknowledgement message(s) being lost. The first computer is therefore unable to explicitly determine whether any of the data was received by the second computer. To avoid retransmitting each element of data and congesting the network, only the most recently transmitted element of data is retransmitted. A subsequent acknowledgement message, sent in response, may indicate that none, or some of the elements of data were not received. These elements of data can be subsequently retransmitted. This method therefore avoids unnecessarily retransmitting every element of data. Instead, only the most recently transmitted element of data is retransmitted until the system is able to determine, via an acknowledgement message, which elements of data were not received.

The method may further comprise:
for data having a receipt requirement whereby the data is required to be received by the second computer:
sending, by the second computer to the first computer, an acknowledgement message associated with the data.

Accordingly, the second computer acknowledges data which requires reliable receipt. The acknowledgement message may indicate that one or more elements of data are believed to be missing (based on a missing sequence number, or the like), or may indicate that one or more elements of data have been received.

The method may further comprise:
receiving, from the first computer, an element of data;
determining, by the second computer, that at least one element of data has not been received, wherein the at least one element of data was transmitted before the received element of data was transmitted; and
transmitting, to the first computer, an acknowledgement message comprising:
an indication that the element of data has been received; and
an indication that the at least one element of data has not been received.

Accordingly, when the second computer receives data, it transmits an acknowledgement message to the first computer to indicate the most recently received element of data, and to indicate one or more missing elements of data. Thus, the second computer can deduce that some data is missing, and can inform the first computer accordingly. This "smart acknowledgement" algorithm ensures that missing data is retransmitted without causing head-of-line blocking.

In some examples, elements of data are associated with sequence numbers, and:

the indication that the element of data has been received comprises an indication of a sequence number associated with the element of data; and the indication that the at least one element of data has not been received comprises an indication of sequence numbers associated with the at least one elements of data.

Accordingly, the "smart acknowledgement" message can be based on the use of sequence numbers. Thus, the acknowledgement message includes a sequence number associated with the most recently received element of data, and a list of one or more other sequence numbers associated with data that is perceived to be missing. Thus, when the first computer receives the smart acknowledgement message, the first computer can retransmit the elements of data indicated in the list.

In some examples, each type of data is associated with a different range of sequence numbers. For example, the first type of data may be associated with a first set/range of sequence numbers and the second type of data may be associated with a second set/range of sequence numbers. In some examples, the sequence number ranges may fully or partially overlap. Alternatively, data types having a receipt requirement whereby the data is required to be received by the second computer may be associated with a first set/range of sequence numbers and data types not having a receipt requirement may be associated with a second set/range of sequence numbers. Thus, when the second computer receives data out of sequence (or otherwise determines that a chunk/element of data has been lost or not received), the second computer can determine, based on the previously received data, whether the chunk of data that has not been received by the second computer is data that requires retransmission. For example, the second computer may determine that the missing sequence number is within a range of sequence numbers where the data has a receipt requirement. The second computer can therefore determine whether the chunk of data is data that (i) has a receipt requirement whereby the data is required to be received by the second computer, or (ii) does not have a receipt requirement. On this basis, the second computer can determine whether to expect to receive the missing data in future (as a result of retransmission).

Accordingly, the method may further comprise:
receiving, from the first computer, plural elements of data, wherein the plural elements of data:
  are a type of data that has a receipt requirement whereby the data is required to be received by the second computer; and
  are associated with a range of sequence numbers;
determining, by the second computer:
  that an element of data has not been received based on the range of sequence numbers associated with the plural elements of data; and
  that the element of data that has not been received is data having a receipt requirement whereby the data is required to be received by the second computer, based on the type of data of the plural elements of data.

The plural elements of data may be data of the first type.

Determining that an element of data has not been received based on the range of sequence numbers associated with the plural elements of data may comprise determining that the range of sequence numbers are non-consecutive. For example, a sequence number in the range of sequence numbers may be missing.

Determining that the element of data that has not been received is data having a receipt requirement whereby the data is required to be received by the second computer, may comprise determining the type of data associated with the plural elements of data. This can be deduced from the plural elements of data received by the second computer. Data received by the second computer can be inspected and the type of data represented by the data can be determined. For example, the data may explicitly indicate the type of data it is.

In some examples, if the second computer determines that the element of data that has not been received is data having a receipt requirement whereby the data is required to be received by the second computer, the second computer can generate an acknowledgement message.

In certain examples, an acknowledgement message is sent for only data having a receipt requirement whereby the data is required to be received by the second computer. In other examples, an acknowledgement message is also sent for data not having a receipt requirement, even though any missing data will not be retransmitted.

In one example, the acknowledgement message is associated with a particular type of data. For instance, in the example where each type of data is associated with a different range of sequence numbers, the first computer may be sending two or more types of data to the second computer. Accordingly, the second computer may send a first acknowledgement message associated with a first type of data and a second acknowledgement message associated with a second type of data. This may simplify the process of determining which data the first computer is to retransmit.

The method may further comprise:
storing, by the first computer:
  a list of sequence numbers associated with data being of a type having a receipt requirement whereby the data is required to be received by the second computer; and
  for each sequence number in the list of sequence numbers, an associated transmission status of the data.

Accordingly, the first computer can keep a record of the data that requires reliable receipt. This allows the first computer to monitor the transmission status of the data. Thus, should the data require retransmission, the first computer can determine that the data has previously been sent and can re-prioritise the data, as described earlier.

The transmission statuses may indicate, one of:
  that the data has not been sent by the first computer;
  that the data has been sent by the first computer;
  that the data has been sent by the first computer, and has been negatively acknowledged by the second computer; and
  that the data has been sent by the first computer, and has been positively acknowledged as being received by the second computer.

For example, when the first computer obtains the data, its transmission status indicates that the data has not been sent. Once sent, the transmission status is updated to indicate that the data has been sent.

If the first computer determines that the data has not been received by the computer, then the transmission status can indicate that it has been negatively acknowledged. This may occur after a threshold period of time has passed during which an acknowledgement message was not received, for example, or may occur if the acknowledgement message indicates explicitly that the data has not been received. Once received by the second computer and acknowledged, the transmission status can be updated to show that the data has been positively acknowledged (i.e. received).

The method may further comprise:
storing, by the first computer:
  a list of sequence numbers associated with data being of the type not having a receipt requirement; and for each sequence number in the list of sequence numbers, an associated transmission status of the data.

Accordingly, the first computer can may also keep a record of the data that does not require reliable receipt.

The transmission statuses may indicate, one of:
that the data has not been sent by the first computer; and
that the data has been sent by the first computer.

For example, when the first computer obtains the data, its transmission status indicates that the data has not been sent. Once sent, the transmission status is updated to indicate that the data has been sent.

The method may further comprise:
obtaining, by the first computer, fourth data, the fourth data being of a third type of data not having a receipt requirement and having a transmission priority that is the same as a transmission priority associated with the first data;
buffering the fourth data in the one or more buffers; and
transmitting the fourth data to the second computer before transmitting the first data.

Accordingly, there may be different types of data, one being a type of data that requires reliable receipt, the other being a type of data that does not require reliable receipt, where both have the same priority level. In a specific example, it may be preferred to transmit the data that does not require reliable receipt before transmitting the data that does require reliable receipt.

In some examples the one or more buffers comprise a buffer for each type of data obtained by the first computer, the buffers each having a transmission priority corresponding to that of the type of data being buffered in the buffer.

Accordingly, there may be a number of buffers which receive/store only data associated with a particular type of data. This can simplify how the computer tracks data of different priorities, while keeping data of different types, but the same priority, separate. Data within each buffer may be transmitted before transmitting data from a subsequent buffer. For example, data in the higher priority buffers is transmitted before data in the lower priority buffers.

In another example, there may be a buffer associated with each transmission priority level. Data of different types, but having the same priority, may be stored within a buffer associated with the corresponding transmission priority. For example, there may be three buffers; a low, medium and high priority buffer. This can further simplify how the computer tracks data of different priorities.

In one example transmitting the data to the second computer comprises transmitting the data via a single network socket. The network socket may be a local network socket, or an Internet socket. Thus, as mentioned, data is transmitted using a single protocol, rather than using a plurality of protocols for different data. Accordingly, the current method is built upon another protocol. In one example, the single network socket is a socket associated with a protocol that does not guarantee reliable receipt.

In one example, transmitting the data to the second computer comprises transmitting the data via a network protocol that does not guarantee reliable receipt. Thus, as mentioned, data is transmitted using a single protocol, rather than using a plurality of protocols for different data. Accordingly, the current method is built upon another protocol.

In a specific example, transmitting the data to the second computer comprises transmitting the data via a UDP socket. Accordingly, current method is built upon UDP, a protocol that does not guarantee the data will be received. This therefore allows the network connection to be used most efficiency. Data retransmission and prioritisation is handled by the above described method, rather than the underlying protocol. The underlying protocol, in this case UDP, is therefore unaware that it may be sending retransmitted data.

In some examples, reading the data from the one or more buffers comprises reading the data from the one or more buffers into a master buffer before transmitting the data from the master buffer to the second computer. Accordingly, data is copied/transferred from the one or more buffers into a master buffer. For example, data is read from the one or more buffers according to the transmission priorities, and is moved into a master (i.e. a single) buffer in priority order. The master buffer may be a UDP buffer, such as a socket send buffer, for example. Thus, data is placed into the buffer in priority order, thereby allowing the transmission of data to be effectively controlled.

In some examples, elements of data are read into the master buffer at a predefined rate. This rate may be known as a tick rate. An element of data can be read from the one or more buffers and placed into the master buffer at a predefined rate, such as every 10 ms, 20 ms, 30 ms, 40 ms, 50 ms, for example. This tick rate may be user configurable. Increasing the tick rate means that more data is being transferred per second. The tick rate has units of bits per second. For example, if one element of data is currently being placed in the master buffer every 50 ms, then to increase the tick rate, one element of data must be placed in the master buffer every 40 ms, 30 ms, 20 ms, or 10 ms.

In some examples, the tick rate is configurable based on the current bandwidth of the connection. For example, the method may further comprise:
transmitting, to the second computer, three or more bandwidth request messages;
receiving, by the second computer, the three or more bandwidth request messages and responsively determining a bandwidth of a connection between the first computer and the second computer;
transmitting, by the second computer to the first computer, a bandwidth estimate message, the bandwidth estimate message indicating the bandwidth determined by the second computer; and
at least one of:
  adjusting, by the first computer, the predefined rate based on the bandwidth determined by the second computer; and
  adjusting, by the first computer, a threshold number of data elements that can be transmitted to the second computer without requiring acknowledgement, based on the bandwidth determined by the second computer.

Thus, in a first example, the rate at which data is sent can be adjusted based on the measured bandwidth. If the bandwidth increases, the data send rate can be increased (i.e. the predefined tick rate can be increased). Similarly, if the bandwidth decreases, the data send rate can be decreased (i.e. the predefined tick rate can be decreased).

In a second example, the number of data elements that can be transmitted to the second computer without requiring acknowledgement can be adjusted based on the measured bandwidth. The threshold number of data elements that can be transmitted to the second computer without requiring acknowledgement may be known as a "transmission window size" variable. This stops unlimited data being sent if none of it is being received. In a specific example, the threshold only applies to data elements being of a type that require reliable receipt.

The second computer can estimate the bandwidth based on the reception times of the three or more bandwidth request messages.

In some examples, the method further comprises:

reading the data from the master buffer and forming a data packet having a payload, the payload comprising the first data and the second data; and transmitting the data to the second computer comprises transmitting the data packet to the second computer.

Accordingly, in some examples the data requiring reliable receipt and data not requiring reliable receipt can be sent in a single packet, such as a UDP packet. Only the data requiring reliable receipt would be acknowledged and retransmitted if not received.

In some examples the method further comprises:

after reading the data from the one or more buffers into the master buffer:

for data not having a receipt requirement, removing data from the one or more buffers; and for data having a receipt requirement whereby the data is required to be received by the second computer, retaining data in the one or more buffers until it is determined that the transmitted data has been received by the second computer.

Accordingly, to reduce memory usage, data that does not require reliable receipt can be deleted from the buffers because it is not needed later, unlike data that requires retransmission.

In some examples the method further comprises, before transmitting the first data and the second data:

sending, by the first computer to all computers in a local area network, a broadcast message;

receiving, by the first computer, a response message from the second computer, the response message indicating at least:

a network address of the second computer; and a security setting used by the second computer;

wherein the first computer transmits data to the second computer in accordance with the security setting.

Accordingly, if the network address of the second computer is not known, a broadcast message can be transmitted on the network (such as a local network) in order to discover the network address of the second computer. The second computer therefore receives the broadcast message and responsively responds to the message to indicate its network address. In addition, the nature/content of the response message from the second computer can be used to determine a security setting, i.e. whether the second computer is implementing an encrypted connection (such as a DTLS UDP socket) or an unencrypted connection (such as a plain UDP socket). For example, if the second computer is running an encrypted DTLS connection, the broadcast message will be rejected by the second computer because it is not a valid message within the DTLS protocol. The "DTLS Message Reject" response message therefore infers that the second computer is running an encrypted DTLS connection. If a DTLS Message Reject response message is not received, it can be inferred that the second computer is running a plain UDP socket. Based on this, the first computer can implement a transmission regime that matches that of the second computer.

In some examples, the method further comprises before transmitting the first data and the second data:

sending, by the first computer, a probe message to the second computer using a preconfigured network address of the second computer;

receiving, by the first computer, a response message from the second computer, the response message indicating:

a security setting used by the second computer;

wherein the first computer transmits data to the second computer in accordance with the security setting.

Thus, if the network address of the second computer is known, a message can be transmitted to the second computer. In a similar way as described above, the response message can be used to infer a security setting used by the second computer. Thus, the first computer can dynamically determine the applicable security setting of the second computer. This allows the first computer to communicate with computers that have different security settings.

In one example the methods described herein are computer implemented methods.

In a second aspect, a method of transmitting data between a first computer and a second computer, comprises:

obtaining, by the first computer, data for transmission to the second computer;

buffering the obtained data in one or more buffers;

sending, by the first computer to all computers in a local area network, a broadcast message;

receiving, by the first computer, a response message from the second computer, the response message indicating at least:

a network address of the second computer; and a security setting used by the second computer;

reading the data from the one or more buffers; and transmitting the data to the second computer in accordance with the security setting.

In some examples, the broadcast message is also obtained and/or buffered in the one or more buffers before being sent to the computers in the local area network.

In a third aspect, a method of transmitting data between a first computer and a second computer, comprises:

obtaining, by the first computer, data for transmission to the second computer;

buffering the obtained data in one or more buffers;

sending, by the first computer, a probe message to the second computer using a preconfigured network address of the second computer;

receiving, by the first computer, a response message from the second computer, the response message indicating:

a security setting used by the second computer;

reading the data from the one or more buffers; and transmitting the data to the second computer in accordance with the security setting.

In some examples, the probe message is also obtained and/or buffered in the one or more buffers before being sent to the computers in the local area network.

In a fourth aspect, a method of transmitting data between a first computer and a second computer, comprises:

obtaining, by the first computer, plural elements of data for transmission to the second computer, wherein the plural elements of data have a receipt requirement whereby the data is required to be received by the second computer;

buffering the obtained plural elements of data in one or more buffers;

transmitting the plural elements of data to the second computer;

determining that the plural elements of data have not been acknowledged by the second computer within a threshold period of time; and retransmitting the most recently transmitted element of data of the plural elements of data.

The method may further comprise, after retransmitting the most recently transmitted element of data of the plural elements of data, receiving an acknowledgement message from the second computer, wherein the acknowledgement message indicates:

that the retransmitted element of data has been received; and that at least one further element of data of the plural elements of data has not been received.

Accordingly, in response to retransmitting the most recently transmitted, but unacknowledged element of data, the first computer receives a "smart acknowledgement" message.

The method may further comprise, after receiving the acknowledgement message:

retransmitting the at least one further element of data of the plural elements of data.

In a fifth aspect, a method of transmitting data between a first computer and a second computer, comprises:

obtaining, by the first computer, data for transmission to the second computer;

buffering the obtained data in one or more buffers;

transmitting, to the second computer, three or more bandwidth request messages;

receiving, by the second computer, the three or more bandwidth request messages and responsively determining a bandwidth of a connection between the first computer and the second computer;

transmitting, by the second computer to the first computer, a bandwidth estimate message, the bandwidth estimate message indicating the bandwidth determined by the second computer; and at least one of:
transmitting, by the first computer, the data at a predefined rate based on the bandwidth determined by the second computer; and
adjusting, by the first computer, a threshold number of data elements that can be transmitted to the second computer without requiring acknowledgement.

In some examples, the data is read from the one or more buffers into a master buffer at the predefined rate, and the method further comprises, before transmitting the data:

adjusting, by the first computer, the predefined rate based on the bandwidth determined by the second computer.

According to another aspect of the present invention there is provided a system comprising memory and at least one processor configured to implement a method according to the first, second, third, fourth or fifth aspects of the present invention. For example, the system may comprise a first computer and/or a second computer.

In the second, third, fourth or fifth aspects of the present invention, the data obtained may comprise data of different types, different receipt requirements, and may be transmitted according to transmission priorities. Accordingly, features of the first aspect of the present invention may also be implemented in the second, third, fourth or fifth aspects of the present invention.

According to a further aspect of the present invention there is provided a first computer comprising:

memory; and at least one processor configured to:
obtain data for transmission to a second computer, the data comprising at least first data and second data, the first data being of a first type of data and the second data being of a second type of data, each type of data having an associated transmission priority, and the first type of data having a receipt requirement whereby the data is required to be received by the second computer and the second type of data not having a receipt requirement;
buffer the obtained data in one or more buffers;
read the data from the one or more buffers and transmitting the data to the second computer according to the transmission priorities; and
for only transmitted data having a receipt requirement whereby the data is required to be received by the second computer, determine, by reference to an expected acknowledgement message from the second computer, whether the transmitted data has been received by the second computer and, if it is determined not to have been received, retransmit the data to the second computer.

According to another aspect of the present invention there is provided a system comprising a first computer and a second computer, wherein the first computer comprises:

first memory; and a first processor configured to:
obtain data for transmission to the second computer, the data comprising at least first data and second data, the first data being of a first type of data and the second data being of a second type of data, each type of data having an associated transmission priority, and the first type of data having a receipt requirement whereby the data is required to be received by the second computer and the second type of data not having a receipt requirement;
buffer the obtained data in one or more buffers; read the data from the one or more buffers and transmitting the data to the second computer according to the transmission priorities; and
for only transmitted data having a receipt requirement whereby the data is required to be received by the second computer, determine, by reference to an expected acknowledgement message from the second computer, whether the transmitted data has been received by the second computer and, if it is determined not to have been received, retransmit the data to the second computer;

wherein the second computer comprises second memory and a second processor configured to:
receive, from the first computer, an element of data; and
for data having a receipt requirement whereby the data is required to be received by the second computer:
transmit, to the first computer, an acknowledgement message comprising an indication that the element of data has been received.

In some examples the first processor is configured to:
obtain, third data, the third data being of the first type of data;
buffer the third data in the one or more buffers;
determine that the first data was not received by the second computer; and responsively:
update the transmission priority of the first data to a level that is higher than that of the third data; and
retransmit the first data to the second computer before transmitting the third data to the second computer.

In some examples the first processor is configured to:
for data having a receipt requirement whereby the data is required to be received by the second computer:
determine that plural elements of data have not been acknowledged by the second computer within a threshold period of time; and
retransmit the most recently transmitted element of data of the plural elements of data.

In some examples the second processor is configured to:
determine that at least one element of data has not been received, wherein the at least one element of data was transmitted, by the first computer, before the element of data was transmitted by the first computer; and
transmit, to the first computer, the acknowledgement message comprising:
an indication that the at least one element of data has not been received.

In some examples, elements of data are associated with sequence numbers, and wherein:

the indication that the element of data has been received comprises an indication of a sequence number associated with the element of data; and the indication that the at least one element of data has not been received comprises an indication of sequence numbers associated with the at least one elements of data.

In some examples the first processor is configured to:

store a list of sequence numbers associated with data being of a type having a receipt requirement whereby the data is required to be received by the second computer; and for each sequence number in the list of sequence numbers, an associated transmission status of the data.

In some examples the first processor is configured to:

store a list of sequence numbers associated with data being of the type not having a receipt requirement; and for each sequence number in the list of sequence numbers, an associated transmission status of the data.

In some examples the first processor is configured to:

obtain fourth data, the fourth data being of a third type of data not having a receipt requirement and having a transmission priority that is the same as a transmission priority associated with the first data;

buffer the fourth data in the one or more buffers; and transmit the fourth data to the second computer before transmitting the first data.

In some examples the first processor is configured to:

read the data from the one or more buffers into a master buffer; and transmit the data from the master buffer to the second computer.

In some examples the first processor is configured to read elements of data into the master buffer at a predefined rate.

In some examples the first processor is configured to:

transmit, to the second computer, three or more bandwidth request messages;

and the second processor is configured to:

receive the three or more bandwidth request messages and responsively determine a bandwidth of a connection between the first computer and the second computer;

transmit, to the first computer, a bandwidth estimate message, the bandwidth estimate message indicating the bandwidth determined by the second computer; and the first processor is configured to, at least one of:

adjust the predefined rate based on the bandwidth determined by the second computer; and adjust a threshold number of data elements that can be transmitted to the second computer without requiring acknowledgement.

In some examples the first processor is configured to:

read the data from the master buffer and form a data packet having a payload, the payload comprising the first data and the second data; and transmit the data packet to the second computer.

In some examples the first processor is configured to:

after reading the data from the one or more buffers into the master buffer:

for data not having a receipt requirement, remove data from the one or more buffers; and for data having a receipt requirement whereby the data is required to be received by the second computer, retain data in the one or more buffers until it is determined that the transmitted data has been received by the second computer.

In some examples the first processor is configured to, before transmitting the first data and the second data:

send, to all computers in a local area network, a broadcast message;

receive, by the first computer, a response message from the second computer, the response message indicating at least:

a network address of the second computer; and a security setting used by the second computer; and transmit data to the second computer in accordance with the security setting.

In some examples the first processor is configured to, before transmitting the first data and the second data:

send a probe message to the second computer using a preconfigured network address of the second computer;

receive, by the first computer, a response message from the second computer, the response message indicating:

a security setting used by the second computer;

transmit data to the second computer in accordance with the security setting.

The inventions summarized above enable the more efficient operation of computers, and in particular the more efficient communications between computers. The inventions also have additional advantages in making computer communications more efficient where the communicated data is comprised of a mixture of high-priority/critical information and low priority/non-critical information which needs no acknowledgement. Further features and advantages of the invention will become apparent from the following description of preferred embodiments of the invention, given by way of example only, which is made with reference to the accompanying drawings.

DETAILED DESCRIPTION

Figure 1:
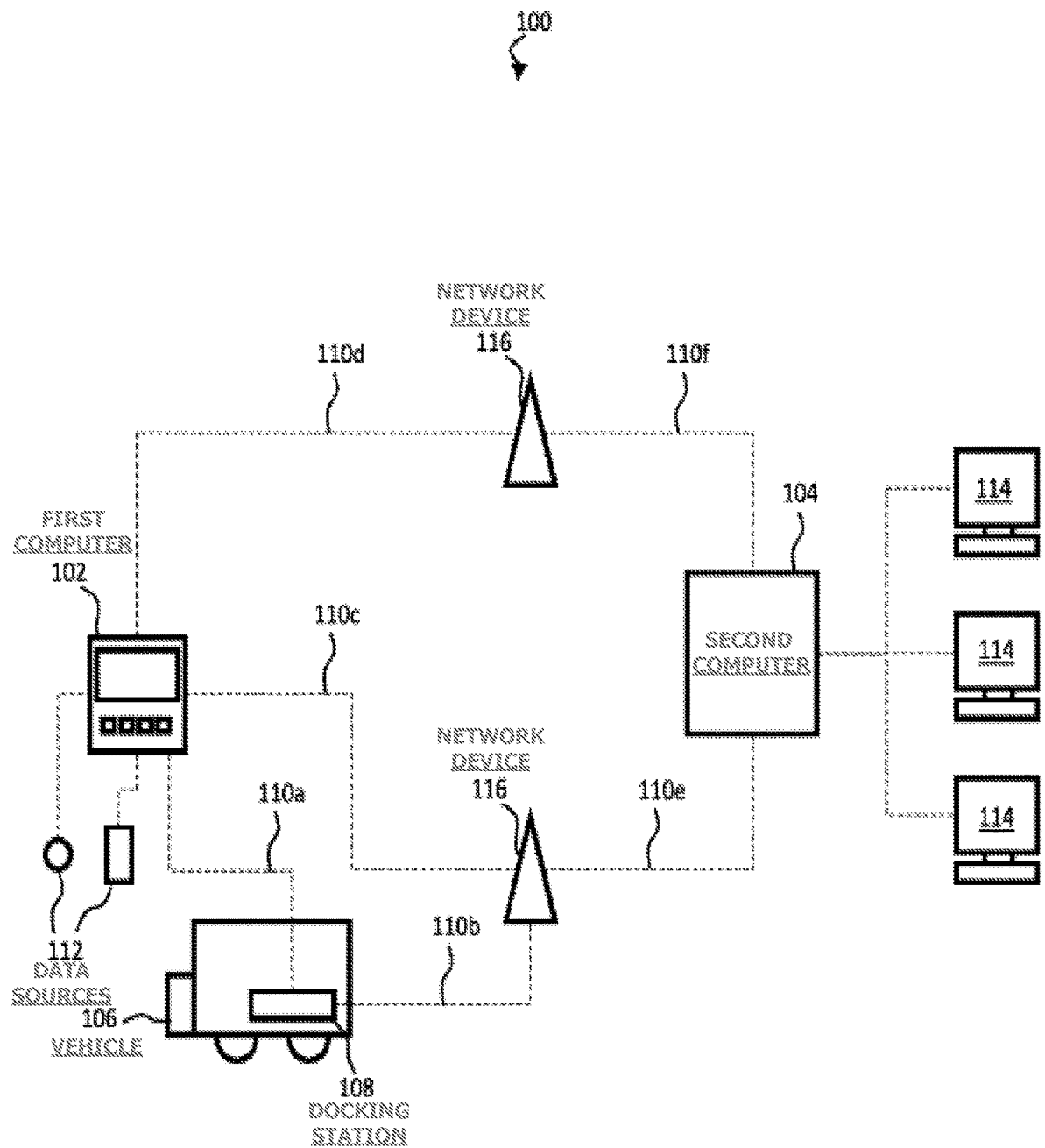
FIG. 1 is a block diagram of a system used to transmit data between a first computer and a second computer according to an example.

FIG. 1 depicts an exemplary system 100 used to transmit data between a first computer 102 and a second computer 104. The first computer 102 in this example is a device used for medically monitoring patients. However, the method described herein may be used by any type of computing device. The second computer 104 in this example is a server. However, the second computer may be any type of computing device and may in addition, or alternatively, be a device used for medically monitoring patients. The first and second computers 102, 104 may each comprise memory and one or more processors capable of processing machine readable instructions to implement the methods described herein.

Medical personnel, such as a paramedic, may use the device 102 during an emergency. For example, one can imagine the scenario where one or more patients have been involved in an accident and one or more paramedics are called upon to provide assistance. A paramedic may arrive at the scene of the accident in a vehicle 106, such as an ambulance, which is equipped with the device 102. Using the device 102, the paramedic is able to monitor each patient at the scene of the accident, away from the ambulance, as well as doing so while travelling to a medical facility while inside the vehicle 106. Exemplary medical facilities may include a hospital or doctor's surgery. The device 102 may operate independently, or may be electrically and/or communicatively couplable to a docking station 108, mounted in the vehicle 106, via a communications path 110a, such as a wired and/or wireless connection.

The device 102 can receive and store different types of data from one or more sources 112, such input devices, sensors or instruments. The data may comprise medical data indicative of a patient's current health and/or medical status and may include blood pressure, heart rate, temperature, or any other type of medical data. The medical data can be collected, processed and/or at least temporarily stored by the device 102. Other data, such as patient data, can also be received from an operator via a user interface. For example, an operator may add patient data such as incident notes, and/or a patient's name, age and/or apparent condition, via a keyboard, keypad or pointing device. Other kinds of patient and/or medical data, such as sound/speech or image data, may be received via a respective microphone or a still or video camera.

Data can also be generated within the device 102. For example, real-time data measured by a sensor 112 can be processed to calculate an average reading. Other non-medical or patient data can also be generated by the device 102. For example, communications connection data can be generated when the device 102 or operator wishes to establish a connection with another entity, such as the server 104.

Accordingly, data of many different types may be obtained by the device 102. In some circumstances, it may be useful to transmit this data to another entity, such as the server 104. The data stored within the server 104 can be then accessed by a number of computers 114. For example, a telemedicine application may provide access to the data stored on the server 104. Each computer 114 may be located in a different room of a medical facility, or each may be located in a different medical facility. Medical personnel, such as nurses and doctors, may access at least some of the data stored on the server 104.

To facilitate the transmission of the data to the server 104, the device 102 is configured to connect to one or more communication networks. For example, the device 102 may comprise local and wide area network communications capabilities as part of a communications module (not shown). For example, the device 102 may support local communications via one or more of Wi-Fi, ZigBee, NFC and Bluetooth communications protocols. The device 102 may also support wide area network communications to transmit data via one or more of a radio network, a cellular network (implementing one or more of 2G, 3G, 4G, or 5G protocols) and even satellite networks. The data can be communicated via one or more network devices 116, such as cellular base-stations, satellites, radio masts, or access points. The device may, therefore, communicate data to the server 104 via local and/or wide area communications networks. In some examples, data may be communicated by the device 102 to the server 104 directly via local and/or wide area networks. In other examples, the data may be communicated via other devices or intermediaries. For example, the docking station 108 may comprise wide area network communication capabilities, via connection path 110b. Thereby, data can be transmitted indirectly between the device 102 and the remote server 104 via the docking station 108, via the communication path 110a. Illustrative data connections are depicted by respective communication paths 110a, 110b, 110c, 110d, 110e, 110f.

Data Types

On occasion, the device 102 may be located in a remote location where data connectivity is unreliable. For example, cellular connections may be intermittent, suffer high data loss, and/or have low bandwidth. In these situations, data may be prioritised, because some of the data may be considered more urgent than other data. Accordingly, transmission of this data may be prioritised to ensure that it is received before less urgent data.

TABLE 1

| Data Type | Priority | Requires reliable receipt? |
| --- | --- | --- |
| Connection Message (Start or Disconnect) | High | Yes |
| Real-time heart rate | Medium | No |
| Blood pressure (30 second average) | High | No |
| Heart rate (1 minute average) | Low | Yes |
| Medical history information | Medium | Yes |

Table 1 depicts a table showing some example types of data, their associated priorities and an indication of whether they require reliable receipt. The table shows five example types of data, which includes a connection message, real-time heart rate, blood pressure (30-second average), heart rate (1-minute average), and medical history information. Other types of data may also be present. Although the example indicates that there are five types of data, there may be two or more types of data.

The table shows that certain types of data are to be prioritised above other types of data, according to one example. Accordingly, higher priority data should be transmitted before lower priority data. In this example, a connection message (such as a start message) is considered to be of a higher priority than certain types of patient data (such as real-time heart rate data) because, without the connection start message, a data connection cannot be established. Similarly, medical history information may be more valuable to medical personnel than a 1-minute averaged heart rate reading, and so is of a higher priority. Accordingly, each type of data may have an associated transmission priority. Although this example indicates there are three priority levels, there may be two or more priority levels in other examples. More generally, other examples may prioritise data differently.

Certain types of data have a receipt requirement whereby the data is required to be received by the server 104. For example, a connection message may require reliable receipt in order to enable the connection to be established. Other types of data, such as certain real-time data, may not have a receipt requirement. For example, real-time heart rate data may not need to be received by the server 104. The device 102 and the server 104 can determine whether the data has a receipt requirement whereby the data is required to be received by knowing the data type.

It is important to ensure that the highest priority data is transmitted first, and that any data requiring reliable receipt (of any priority) is retransmitted if not received by the server 104. To achieve this, a new protocol and method of transmitting data has been developed. Herein, the protocol is referred to as an Enhanced Data Service (EDS) protocol. In some examples, the EDS protocol may be built upon a protocol that does not guarantee data delivery, such as UDP. In broad terms, EDS prepares data for transmission by prioritising the order in which data is sent while also ensuring retransmission of certain types of data. This new protocol, among other advantages, may use network resources more efficiently (for instance, data that may not need to be received can dispense with the retransmission overhead of TCP). Example implementations of EDS will now be described.

Overview of EDS Process

Figure 2:
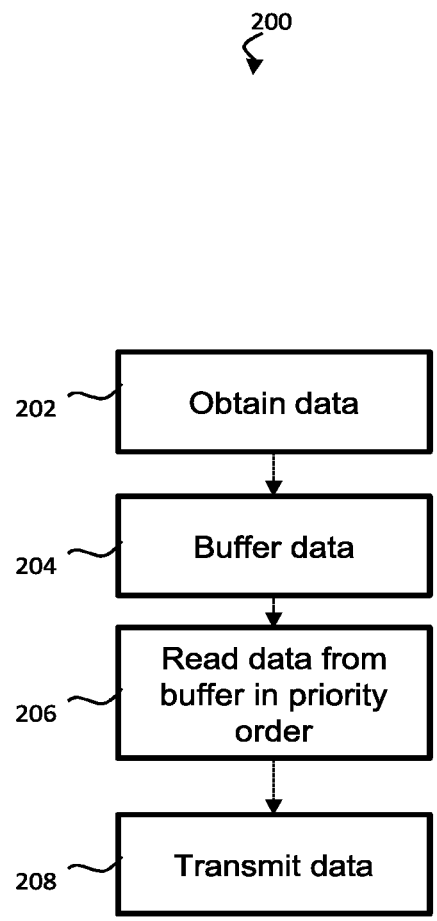
FIG. 2 is a flow diagram of a method of transmitting data according to an example.

FIG. 2 is a flow diagram showing a method 200 of transmitting data between a first computer, such as the device 102, and a second computer, such as the server 104. The flow diagram represents a broad overview of processes and further method steps which are described in more detail in relation to FIGS. 3 and 4.

At block 202, the method comprises obtaining, by the device 102, data for transmission to the server 104. In one example, the data comprises at least first data and second data, the first data being of a first type of data and the second data being of a second type of data, each type of data having an associated transmission priority, and the first type of data having a receipt requirement whereby the data is required to be received by the server 104 and the second type of data not having a receipt requirement. For example, the first type of data may be a Connection Message, having a high priority and requiring reliable receipt. The second type of data may be a Real-time Heart Rate data, having a medium priority and not requiring reliable receipt. Block 202 can be performed as part of a preparation process 306 or in an initial step of a buffering process 308 (described later in relation to FIG. 3).

At block 204, the method comprises buffering the obtained data in one or more buffers. The first data may be stored in a high priority buffer, and the second data may be stored in a medium priority buffer, for example. Alternatively, the first and second data may be stored in a single buffer. Block 204 can be performed as part of the buffering process 308, for example (described later in relation to FIG. 3).

At block 206, the method comprises reading the data from the one or more buffers and transmitting the data to the server 104 according to the transmission priorities. For example, block 206 may comprise selecting the first data from the buffer in which it is stored, causing the first data to be transmitted, then selecting the second data from the buffer in which it is stored, and causing the second data to be transmitted. In one specific example, transmitting the data comprises writing the data to a UDP socket in priority order, and the data is transmitted via UDP. Block 206 can be performed as part of an export process 310 and a communication process 312 (described later in relation to FIG. 3).

At block 208, the method comprises: for only transmitted data having a receipt requirement whereby the data is required to be received by the server 104, determining, by the device 102 by reference to an expected acknowledgement message from the server 104, whether the transmitted data has been received by the server 104 and, if it is determined not to have been received, retransmitting the data to the server 104. Block 208 may therefore comprise receiving an acknowledgement message from the server 104 which indicates that the first data was not received. Based on this acknowledgement message, the device 102 can retransmit the data. The step of determining whether the transmitted data has been received can be performed as part of an acknowledgement process 314, and the step of retransmitting the data can be performed as part of the buffering process 308, the export process 310 and the communication process 312 (described later in relation to FIG. 3).

Figure 3:
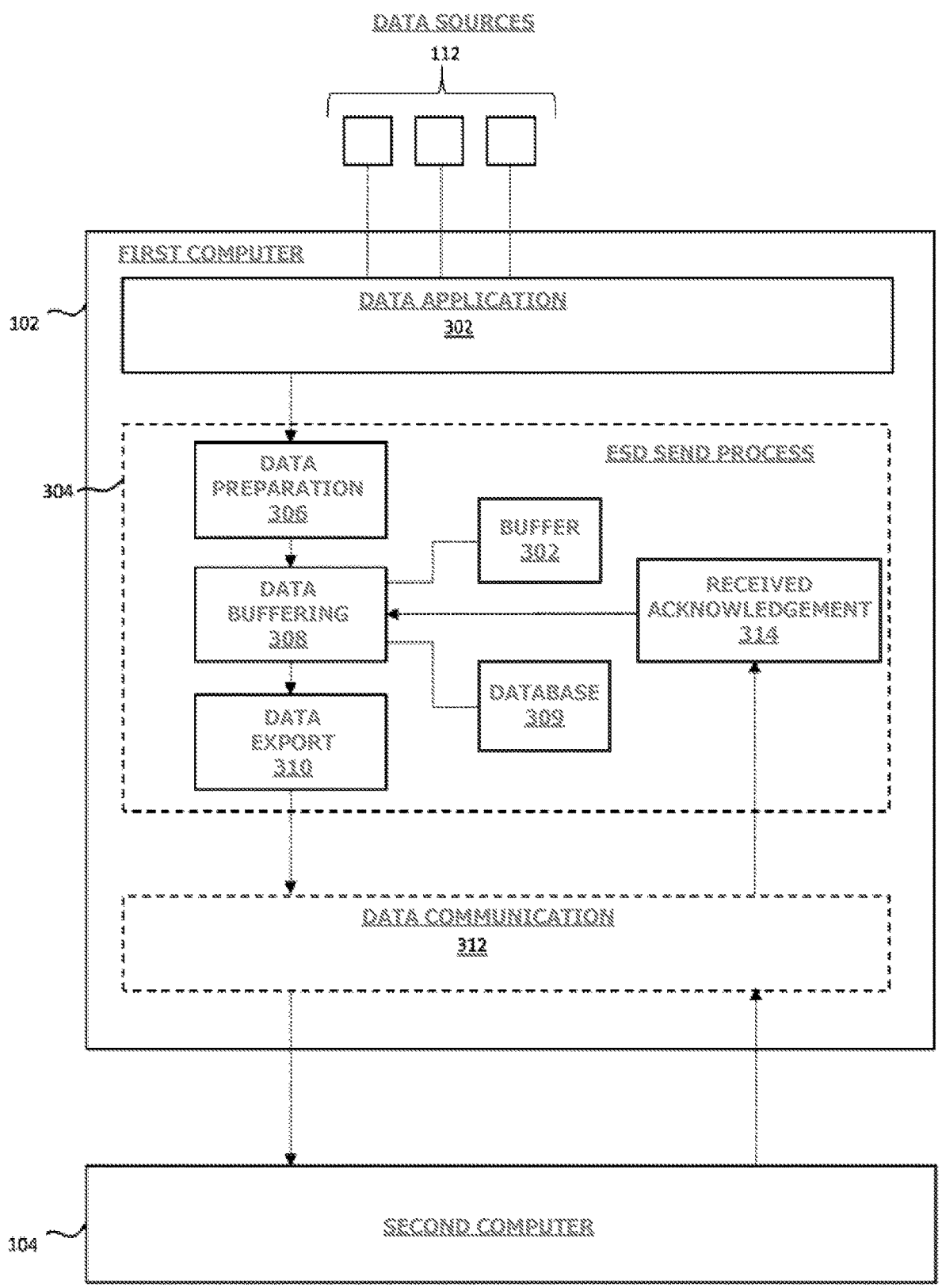
FIG. 3 is a block diagram of a first computer transmitting and receiving data according to an example.
Figure 4:
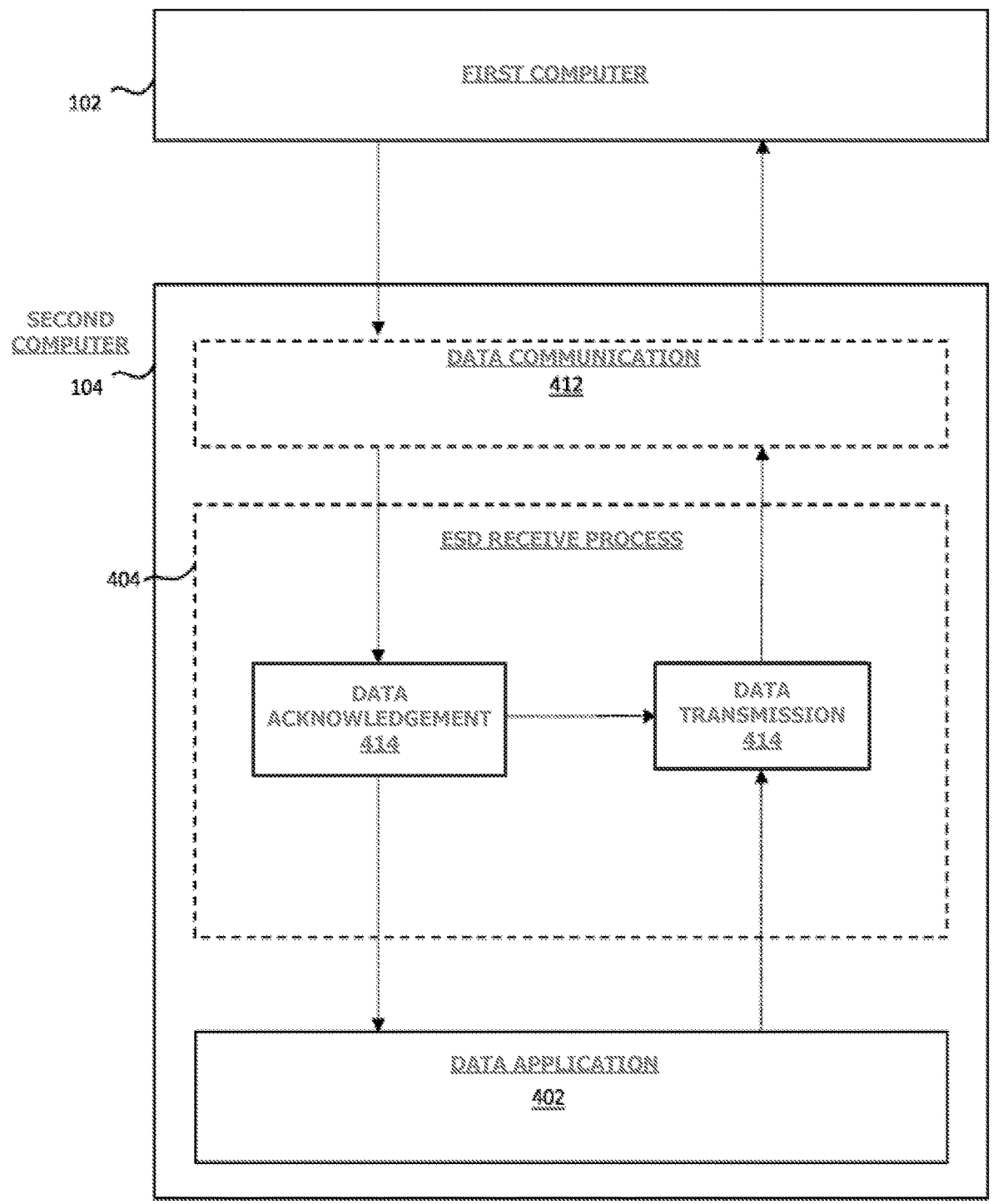
FIG. 4 is a block diagram of a second computer transmitting and receiving data according to an example.

FIGS. 3 and 4 depict a more detailed view of the device 102, the server 104 and processes performed by each of these. Device 102 can perform the method 200 described above.

The device 102 is running an application 302 which generates or receives data. The application may be a medical monitoring application, for example. The application 302 may receive data from a number of sources 112. In addition, the application 302 can also generate its own data. For example, the application 302 may be arranged to transmit data to the server 104, so can establish a connection between the device 102 and the server 104 by generating a "connection start" message. Data may also be generated by processing data received from the sources 112.

When data is to be transmitted, the application 302 communicates the data to an EDS send process 304. The EDS send process 304 causes the data to be transmitted based on the priorities of the received data, while also handling the retransmission of data which requires reliable receipt (if the data is not received by the server 104).

The EDS send process 304 therefore obtains data of different types from the application 302. In some examples, the EDS send process 304 also generates its own data for transmission to the server 104. In one example, the EDS send process 304 runs from within the application 302. In other examples, the application 302 and EDS send process 304 are separate.

The EDS send process 304 can distinguish between the different types of data it obtains. Accordingly, in one example, the data generated within the application 302 can be embedded or tagged with metadata to indicate the data type. For example, data exported by the application 302 can be formatted in accordance with the JavaScript Object Notation (JSON) syntax. A data string may indicate the particular type of data. For example, if the data type is a connection message, the data may include "type": "Connection". Thus, when data is obtained by the EDS send process 304, the data type can be determined by parsing the data.

Once the data has been received by the EDS send process 304, the data is readied for transmission. In an optional preparation process 306, the data may be divided into a number of appropriately sized data chunks (if the data is not already formatted appropriately).

Once the data has been prepared, a buffering process 308 is performed. Here, the data is stored/buffered in one or more buffers 307 while the data awaits transmission (a more detailed illustration of the buffers can be found in FIGS. 5 and 6). The preparation process 306 or the buffering process 308 may include assigning a sequence number to each chunk of data, for example, to allow the transmission status of the data to be monitored and tracked. A database 309, accessible by the buffering process 308, may store a list of the sequence numbers and their associated transmission statuses.

For example, the database 309 may record whether the data has been sent, and whether the data has been acknowledged (if the data requires reliable receipt). In some examples, the database 309 may only store a list of sequence numbers associated with data being of a type requiring reliable receipt and respective transmission statuses. However, in other examples, the database 309 also stores a list of sequence numbers associated with data being of a type not requiring reliable receipt and respective transmission statuses. In a particular example, the sequence numbers and transmission statuses are stored in the buffer 307 with the associated data, rather than being in a separate database 309.

Next, an export process 310 is performed. The export process 310 reads data from the one or more buffers 307 and communicates this data to a communication process 312, which handles the actual transmission of the data. The data is communicated to the communication process 312 based on the transmission priorities of data stored in the buffers. For example, data having the highest priority is exported before data of a lower priority. This ensures that the communication process 312 transmits the highest priority data first.

The communication process 312 receives the data from the export process 310 in priority order. The communication process 312 establishes a connection with the server 104, and transmits the data in the order received from the export process 310.

In a specific example, transmitting the data comprises establishing a UDP socket. The data received from the export process 310 can be written to the UDP socket in priority order, and is thus transmitted to the server 104.

The communication process 312 may also buffer the data in one or more other (transmit) buffers before the data is sent. The buffer may be a UDP buffer, for example. Accordingly, in this manner, the EDS send process 304 controls the order in which data is transmitted to the server 104. A more detailed description of the export process 310 and the communication process 312 is provided below in relation to FIG. 7.

The server 104 is running an EDS receive process 404, as shown in FIG. 4. Data transmitted by the device 102 is received by the server 104. Initially, the data is received as part of a communication process 412. The communication process 412 is a process that is configured to receive data that has been transmitted by the corresponding communication process 312 of the device 102. In a specific example, the communication process 412 receives the data via a UDP socket. The received data is then communicated to the EDS receive process 404. The EDS receive process 404 may include several processes, in addition to those shown.

An acknowledgement process 414 receives the data from the communication process 412. From here, the received data can be communicated to an application 402. The application 402 may be a telemedicine application, for example, which is used by medical personnel to review the received data. The acknowledgement process 414 may order the data, for instance based on sequence numbers, and then communicate the data to the application 402 in this order. However, in another example the data is passed to the application 402 in the order in which it is received. The application 402 may process and store the data in a data storage module, for example.

The acknowledgement process 414 may also determine whether the type of data received requires acknowledgement. For data types that require reliable receipt, one or more acknowledgement messages may be generated to indicate that the chunk of data has been reliably received. An acknowledgment message may additionally or alternatively indicate that one or more chunks of data have not been received, which could be deduced based on missing sequence numbers, for example. The acknowledgement process 414 therefore generates acknowledgment messages associated with the transmitted data. These acknowledgement messages can be used by the device 102 to determine whether any data should be retransmitted.

Generated acknowledgement messages are transmitted to the device 102 using a transmission process 416. The transmission process 416 may implement processes substantially similar to processes 306, 308, 310 described in relation to FIG. 3. The transmission process 416 can also send data received from the application 402. The acknowledgement message is communicated to communication process 412 which sends data to the device 102. The communication process 412 may transmit data in substantially the same way as communication process 312. For example, communication process 412 may comprise establishing a UDP socket. The data received from the transmission process 416 can be written to the UDP socket and thus be transmitted to the device 102.

Acknowledgement messages transmitted by the server 104 are received by the device 102. Initially, the data is received by the communication process 312. In a specific example, the communication process 312 implements UDP to receive the data. From here, data is then communicated to the EDS send process 304.

Acknowledgement messages are communicated to an acknowledgement process 314, shown in FIG. 3. Other data received from the server 104 may be handled by an EDS receive process (not shown) before being communicated to the application 302. In the acknowledgement process 314, the acknowledgement message is processed to determine whether any previously sent data requires retransmission. If the acknowledgement message indicates the data was received by the server 104, the transmission status of the specific chunk of data is updated to indicate that the data was positively acknowledged. If the acknowledgement message indicates data was not received by the server 104, the transmission status of the specific chunk of data is updated to indicate that the data has been negatively acknowledged. Accordingly, based on the acknowledgement message, the export process 310 can then cause the data to be retransmitted by again communicating the data to the communication process 312. This continues until there is no further data to transmit or retransmit. A more detailed overview of the retransmission process is described in relation to FIG. 9.

In some examples, upon receipt of data, the server 104 and/or device 102 updates a property of a connectivity status icon to indicate to a user that data has been received. For example, the connectivity status icon may have a particular colour to indicate "good connectivity", i.e. that data has been received recently, such as in the last 30 seconds. If data has not been received in the last 30 seconds, the connectivity status icon may be updated to have a different colour to indicate "limited connectivity", or if data has not been received for a while, such as in the last 2 minutes, the connectivity status icon may have another colour to indicate "no connectivity". The connectivity status icon may be controlled and updated by the application 302, 402.

In one particular example, the device 102 is configured to update its connectivity status icon based upon the receipt of acknowledgement messages received from the server 104. For example, the application 302 may be informed each time an acknowledgement message is received from the server 104, and the application 302 responsively updates the connectivity status icon.

EDS Buffers

Figure 5:
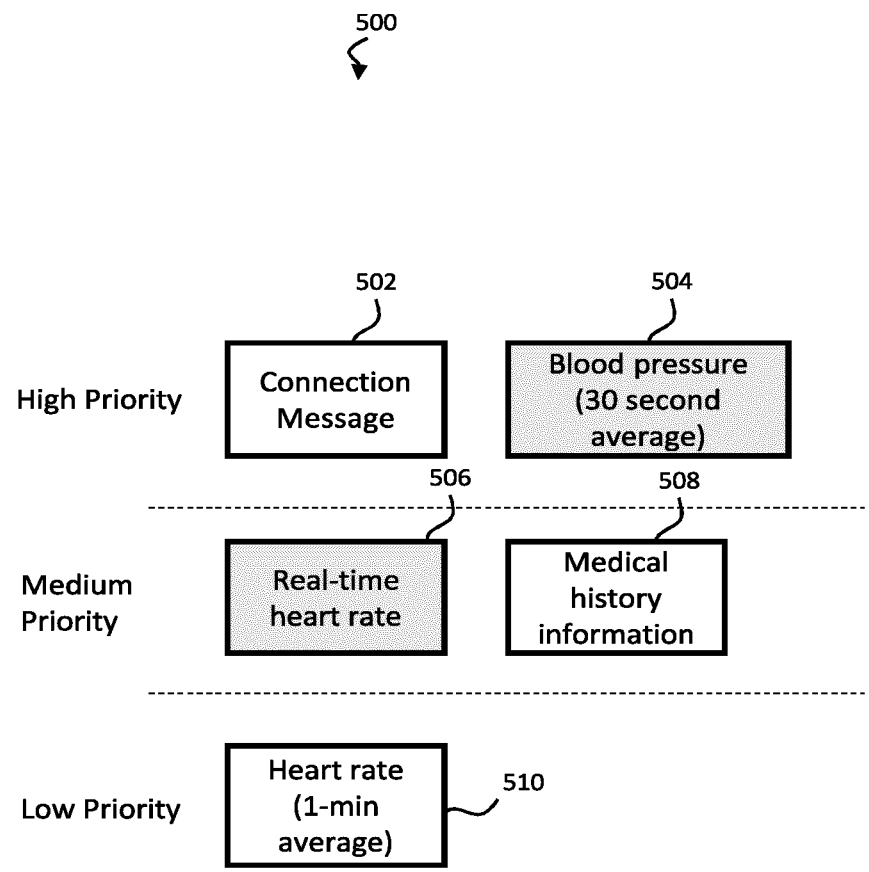
FIG. 5 is a block diagram of prioritised buffers in accordance with a first example.

As mentioned, the data is buffered/stored in one or more buffers 307 during the buffering process 308. These buffers may be referred to as EDS buffers, for example. FIG. 5 depicts a plurality of EDS buffers 500. In this example, there is a separate EDS buffer for each type of data obtained by the device 102. For example, there is a high priority connection message buffer 502, a high priority blood pressure (30 second average) buffer 504, a medium priority real-time heart rate buffer 506, a medium priority medical history information buffer 508 and a low priority heart rate (1-min average) buffer 510. Additional buffers may also be present. Thus, as different types of data are obtained, they can be stored in corresponding buffers as part of the buffering process 308. The shaded buffers indicate buffers which store data that does not require reliable receipt.

Figure 6:
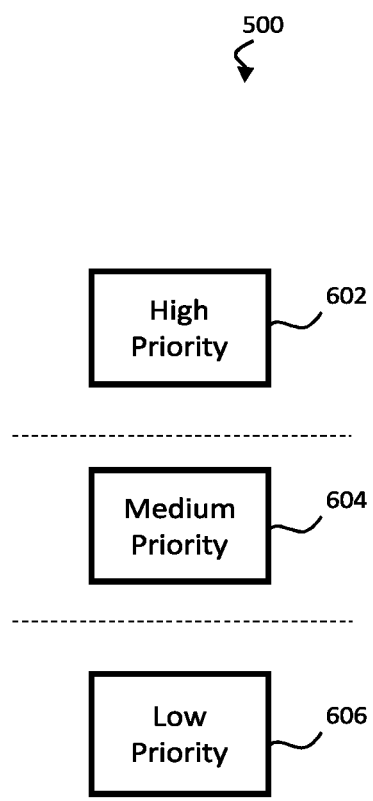
FIG. 6 is a block diagram of prioritised buffers in accordance with a second example.

In another example, there may be one buffer for each priority level, as depicted in FIG. 6. Thus, data of different types but having the same transmission priority may be stored within the same buffer. FIG. 6 depicts a high priority buffer 602, a medium priority buffer 604, and a low priority buffer 608. The high priority buffer 602 can store the connection message type data and the blood pressure (30 second average) type data. The medium priority buffer 604 can store the real-time heart rate type data and the medical history information type data. The low priority buffer 608 can store the heart rate (1-min average) type data.

In a further example, there may be one buffer which stores all of the data. The data stored in this buffer can be labelled in such a way to allow its priority and transmission status to be determined.

Data may be stored in the EDS buffers in a variety of ways. For example, the data may be divided into smaller portions before being stored in the buffers. These portions may be referred to as "chunks" of data.

Once data is stored in the one or more buffers, data is read from the buffers according to the transmission priorities. Thus, as part of the export process 310, data having a higher priority is exported before data having a lower priority. For example, data in the high priority buffers is exported to communication process 312 until all the high priority data has been exported. Only then will the export process 310 begin to export lower priority data. In one example, if two or more EDS buffers have the same priority but one stores data requiring reliable receipt and another stores data not requiring reliable receipt, it may be preferable to first transmit data not requiring reliable receipt. For example, it may be useful to transmit real time data before transmitting non-real time data in certain medical situations. In some circumstances it may be desirable to send the real time data with minimum delay so that the remote clinical care provider can correctly assess the current state of the patient.

The priorities of the data can be determined by first determining the data type, and then determining an associated priority by reference to a look up table, such as that depicted in Table 1. Alternatively, metadata relating to each buffer may indicate the priority.

All data stored in the buffers can have an associated transmission status tag. This can indicate whether the data has been sent, or whether the data has been positively or negatively acknowledged (if relevant to the data type). A transmission status flag associated with data initially obtained by the EDS send process 304 may be automatically set to indicate that the data has not yet been sent. The export process 310 is therefore configured to export data having a transmission status indicating that the data has not been sent. Once exported, the transmission status may be updated to indicate that the data has been sent. This stops the export process 310 from continuously exporting the same chunk of data multiple times. The export process 310 therefore ignores data having a transmission status that indicates the data has been sent.

If the data is negatively acknowledged (i.e. it was not received by the server 104), the transmission status may be updated to indicate this fact. The transmission status may be set to "negatively acknowledged" if an acknowledgement message indicates explicitly that a chunk of data has not been received, or if an acknowledgement message has not been received within a threshold period of time. To ensure this data is retransmitted, the export process 310 is therefore also configured to export data having a transmission status indicating that the data has been negatively acknowledged.

If the data is positively acknowledged (i.e. it was received by the server 104), the transmission status may be updated to indicate this fact. The transmission status may be set to "positively acknowledged" if an acknowledgement message indicates or infers that a chunk of data has been received. The export process 310 may therefore also be configured to ignore data having a transmission status indicating that the data has been positively acknowledged (i.e. has been received).

In some examples, a copy of the data remains in the buffers even after it has been exported to the communication process 312. In a particular example, data that requires reliable receipt remains in the buffers until the data has been positively acknowledged as being received. Afterwards, the data can be deleted. Conversely, data that does not require reliable receipt can be deleted from the buffers once sent.

Master Buffer

In some examples, the data is copied or transferred from the EDS buffers into a single, "master buffer" before being sent. For example, the communication process 312 may establish its own transmission buffer to buffer data received from the EDS send process 304. The master buffer therefore receives and buffers data in the order received from the EDS send process 304.

Figure 7:
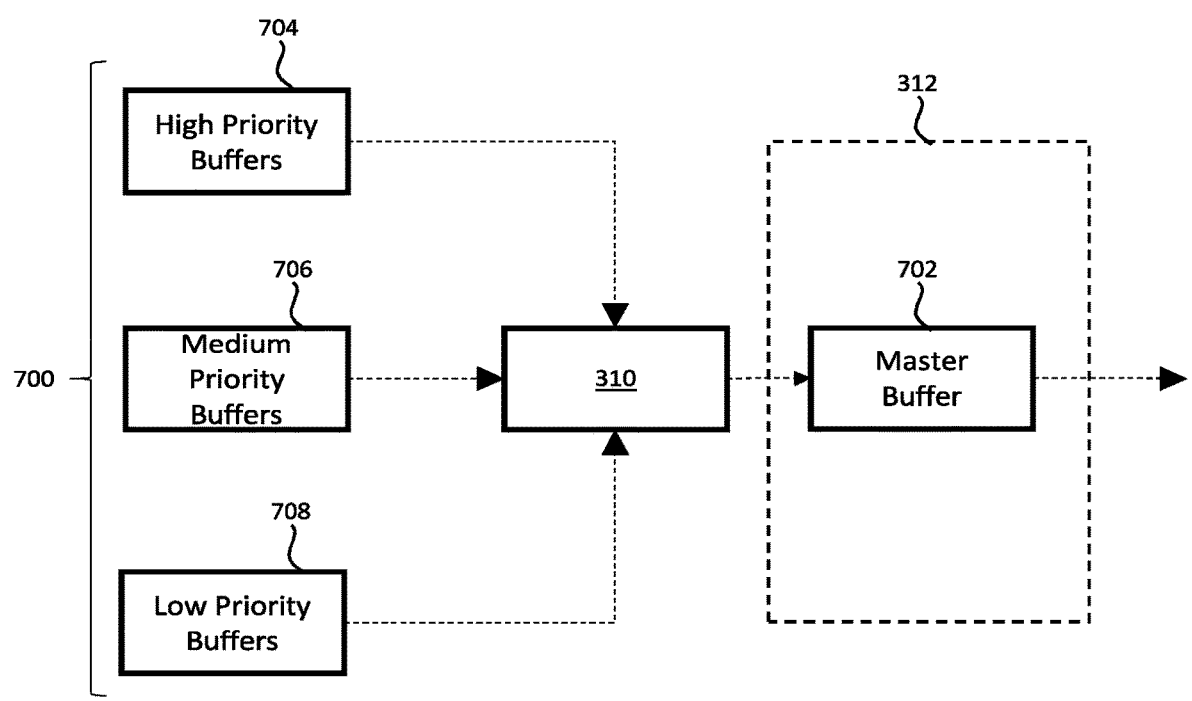
FIG. 7 is a block diagram of data being transmitted between prioritised buffers and a master buffer according to an example.

FIG. 7 depicts the transfer of data from the one or more EDS buffers 700 into a "master buffer" 702. Here, the export process 310 copies or moves the chunks of data into a single master buffer 702 according to the transmission priorities. For example, the export process 310 copies or moves chunks of data from the high, medium and low priority buffers 704, 706, 708. The master buffer 702 can be established, and managed as part of communication process 312. In a specific example, the master buffer 702 is a UDP socket send buffer which is established as part of UDP. Thus, export process 310 can involve establishing a UDP socket and writing the data to the UDP socket in priority order. Once buffered in the master buffer 702, the data is sent using standard UDP procedures. For example, the data may be placed into one or more packets, each packet having a UDP header. Data is therefore transmitted from the master buffer 702 to the server 104 in the order in which the export process 310 exported the data.

In the example of FIG. 7, the export process 310 is configured to read the chunks of data, stored in the EDS buffers 700, into the master buffer 702 at a predefined rate.

This predefined rate may be called a "tick rate". This rate may be one chunk every 20 ms, 30 ms, etc. In other words, the export process 310 is configured to transfer one chunk of data (of a specific size) from the EDS buffers 700 to the master buffer every 20 ms, 30 ms, 40 ms, for example. This rate may be user configurable.

In some examples, the number of chunks placed into the master buffer 702 without requiring acknowledgement is limited by a Transmission Window Size variable. For example, the number of chunks that can be transmitted without acknowledgement may be set by the Transmission Window Size variable. Accordingly, the export process 310 may monitor the number of sent but unacknowledged chunks and temporarily stop transferring data into the master buffer 702 when the number of sent but unacknowledged chunks equals the Transmission Window Size variable. The export process 310 may access the database of transmission statuses to determine the number of unacknowledged chunks. In a specific example, the Transmission Window Size variable is set to 100.

In one example, the tick rate and/or Transmission Window Size variable can be varied based on the bandwidth of the data connection between the device 102 and the server 104. Accordingly, the bandwidth between the device 102 and server 104 may be determined in a bandwidth measurement process, which is described later with reference to FIG. 12.

Data Chunk Creation

As briefly mentioned, the data may already be divided into smaller chunks or elements before being exported by the application 302. However, in other examples, the data is portioned as part of the preparation process 306.

Figure 8:
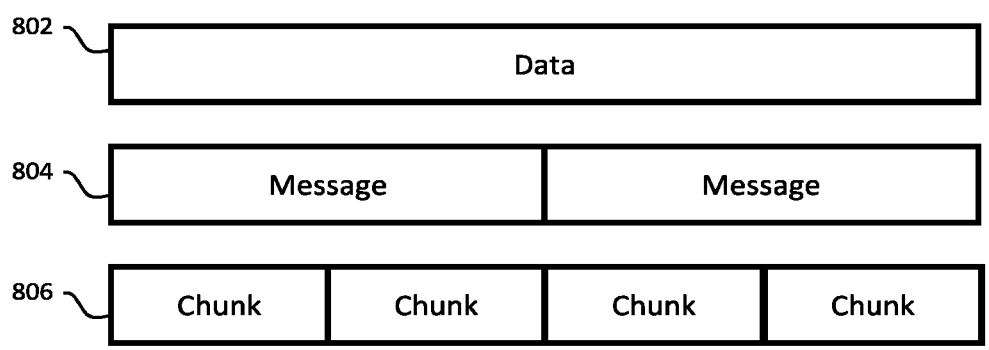
FIG. 8 is a block diagram of data portions according to an example.

FIG. 8 depicts how data may be divided into smaller chunks. The application 302 generates or measures raw data 802 during operation. For example, the raw data 802 may be data measured by the instruments 112. The application 302 can export the raw data 802 as a number of smaller messages 804. These may be of a fixed or different size, for example. A message may correspond to a particular incident, or may include data recorded in particular interval of time. In another example, the raw data 802 is exported by the application 302 without being divided into messages.

Data exported by the application 302 is received by the preparation process 306. Here the data is portioned into a number of manageable EDS chunks 806.

To create an EDS chunk 806, the obtained data (either a message 804, or the raw data 802) is analysed to determine its size. If the data is smaller than a "Maximum Chunk Size" variable, then the data is encapsulated in one chunk 806. If the data exceeds the Maximum Chunk Size, then the data is encapsulated in multiple chunks 806 of the Maximum Chunk Size, with an additional chunk comprising any residual data if required. In some examples each chunk is assigned a sequence number. The Maximum Chunk Size may be user configurable.

Each EDS chunk 806 may be associated with an EDS chunk header. For example, the header may indicate at least one of the following: the type of data, a message sequence number (if relevant), number of chunks used to encapsulate the message (if relevant), chunk sequence number, and total length of the chunk. A chunk payload (i.e. the actual data) is then appended to the EDS header. Once the chunks have been created, they can then be arranged and stored in the one or more EDS buffers as part of the buffering process 308 as described. Once received by the server 104, the data can be rebuilt based on the message and/or chunk sequence numbers. Missing chunks 806 can be retransmitted.

In some examples, the communication process 312 packages a single chunk into a data packet before being sent to the server 104. These data packets may be UDP data packets, for example. This can depend on the Maximum Chunk Size and Maximum Packet Size. Preferably, to avoid fragmentation, the Maximum Chunk Size is set to be less than the Maximum Packet Size.

In other examples two or more chunks may be packaged into a single data packet. These data packets may be UDP data packets, for example. In one specific example, data of different types can be packaged within a single data packet. For example, a chunk of data of a type requiring reliable receipt may be packaged in a single packet with a chunk of data of a type not requiring reliable receipt.

In certain EDS buffers, the buffer is configured to store data corresponding to one message 804 only. Thus, when a new message is generated and received by the EDS send process 304 (where the message may correspond to one or more chunks 806), the old message stored in the buffer is deleted. This may be desirable if only the most recently generated message is needed. For example, only the most recent "Connection Message" may be needed.

In another example, certain EDS buffers are configured to store messages/chunks for a certain length of time. Thus, data that is older than a configured time limit is deleted. For example, certain types of data, such as data not requiring reliable receipt, may be of little use if it is considered to be "old".

Buffer Management

Figure 9:
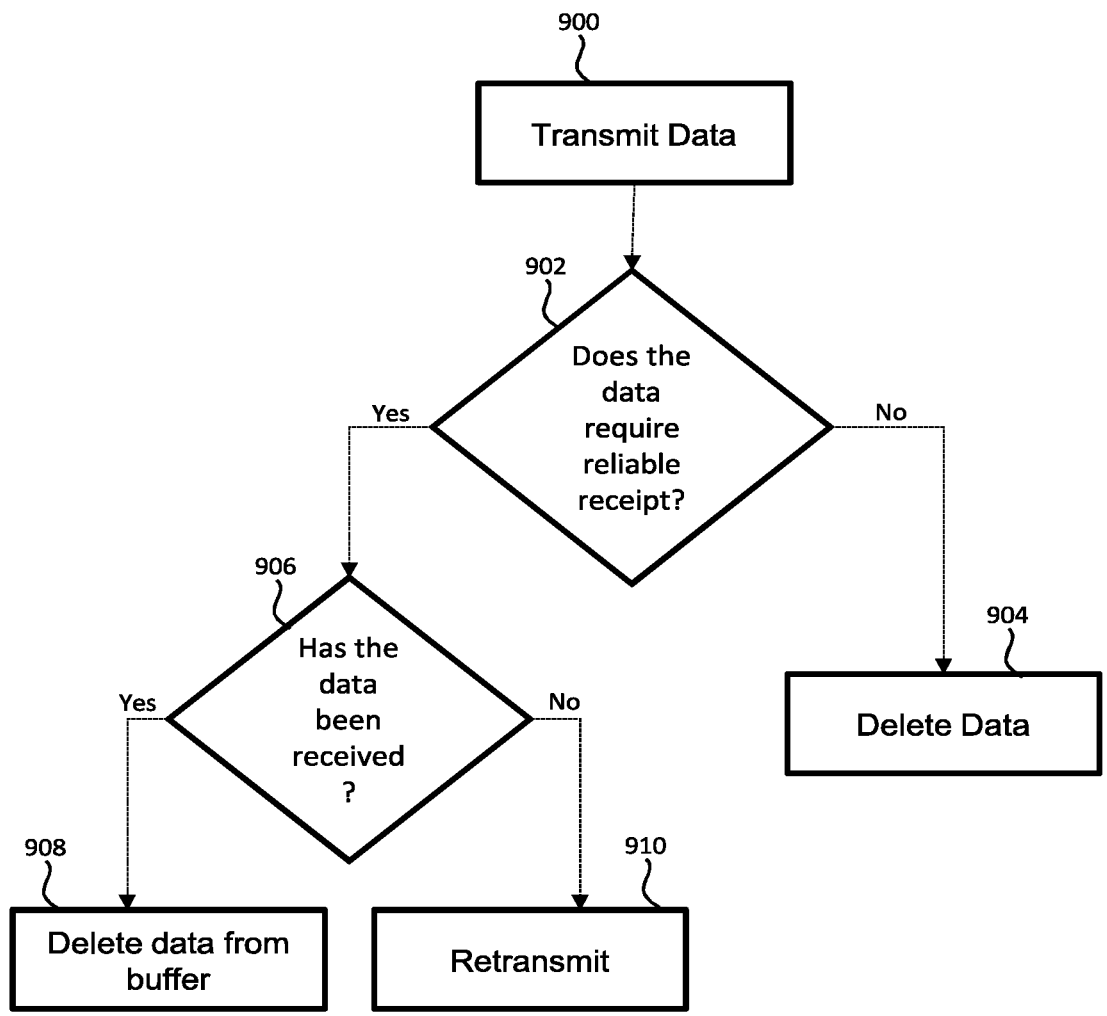
FIG. 9 is a flow diagram of a method according to an example.

FIG. 9 is a flow diagram showing further method steps which may be performed as part of block 208, shown in FIG. 2. At block 900, the method comprises transmitting one or more chunks of data to the server 104 (as part of processes 310 and 312 for example). Once sent, the transmission status of the data chunks may be updated. At block 902, it is determined whether the data that was sent is of a data type that requires reliable transmission. If the data does not require reliable receipt, the method comprises, at block 904, deleting the data from the EDS buffer in which it was stored.

If the data does require reliable receipt, the method comprises, at block 906, determining whether the data has been received by the server 104 by reference to an expected acknowledgement message. Block 906 may occur as part of the acknowledgement process 314. For example, if it is determined that the data has not been positively acknowledged within a threshold period of time, it may be determined that the data was not received by the server 104. Alternatively, a received acknowledgement message may indicate that the data was not received by the server 104. Accordingly, if it is determined that the data has not been received, the data can be retransmitted in block 910. For example, the transmission status of the data can be updated to indicate that the data has been negatively acknowledged. This change in transmission status causes the data to be retransmitted, and therefore be re-exported, as part of processes 310 and 312.

If the data is determined to have been received, i.e. the data has been positively acknowledged, the transmission status can be updated to indicate that the data has been positively acknowledged. This causes the data to be deleted from the EDS buffer in block 908.

In one example, block 910 also comprises updating the transmission priority of the data to a level that is higher than that of other data which is of the same type. For example, the priority level of the data which was not received by the server 104 can be elevated above the priority level of other data in the buffers which has the same type. For example, the data may be tagged as being "urgent", and is therefore prioritised above data of the same type which would ordinarily have the same priority. Alternatively, the transmission status may be updated to indicate that the data has been negatively acknowledged. The export process 310 may therefore be configured to preferentially export data that requires retransmission before exporting data that is being sent for the first time. The export process therefore prioritises data that is tagged as "urgent" or has a transmission status that indicates that the data has been negatively acknowledged over data which has a transmission status indicating it has not yet been sent.

Acknowledgement Messages

Figure 10:
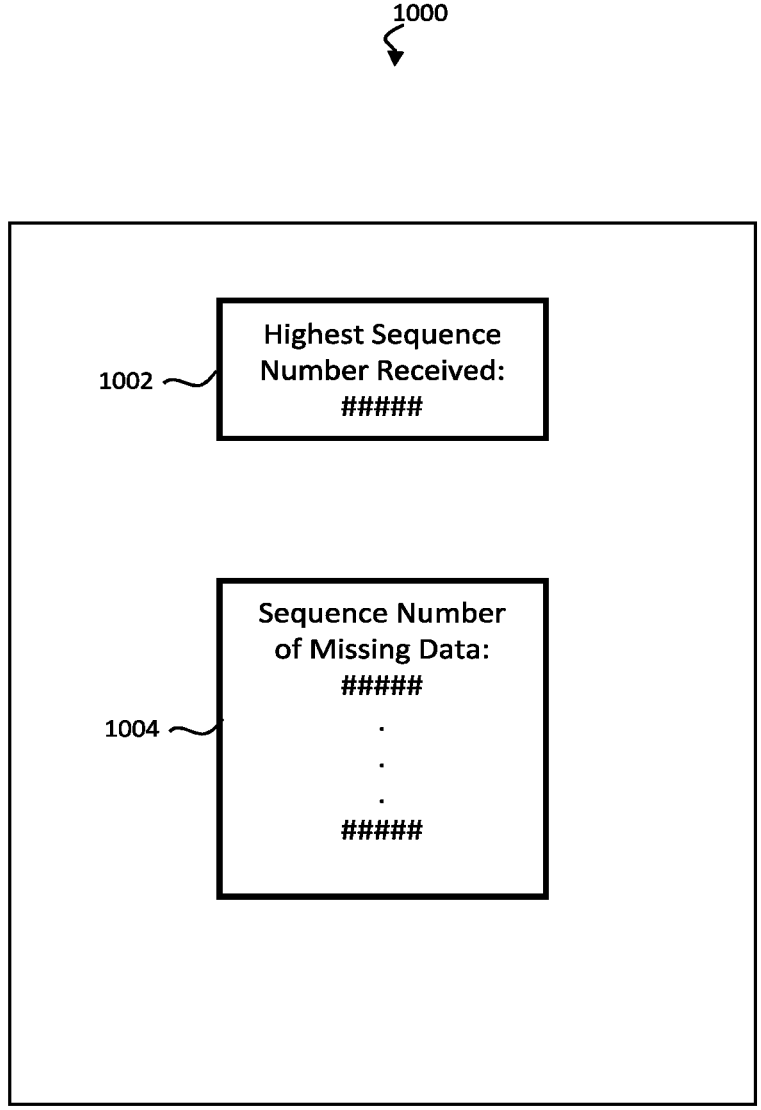
FIG. 10 is a block diagram of an acknowledgement message according to an example.

As mentioned, the second computer, such as server 104, is configured to acknowledge received data that requires reliable receipt. FIG. 10 depicts a "smart" acknowledgement message 1000 generated by the server 104. A smart acknowledgement message may be generated periodically, or each time data requiring reliable receipt is received by the server 104.

In this example it is assumed that each chunk of data requiring reliable receipt is associated with a sequence number. In some examples, each type of data is associated with a different range of sequence numbers. Each smart acknowledgement message 1000 comprises an indication of the highest sequence number received by the second computer 1002, as well as an indication of any missing sequence numbers 1004 (i.e. the sequence numbers associated with data chunks that have not been received). The acknowledgement messages sent by the server 104 may be associated with a particular type of data.

In a first example, assume that 5 chunks of data have been transmitted by the device 102 to the server 104. These chunks of data have the following sequence numbers: 001, 002, 003, 004, 005. Chunks 003, and 004, may have been lost during transmission, for example. The other chunks were successfully received. As the server 104 receives chunk 005, the server 104 can deduce, as part of the acknowledgement process 414, that chunks 003 and 004 are missing because these were never received. Accordingly, the acknowledgement message generated by the server includes, in field 1002, the sequence number 005, and in field 1004, the sequence numbers 003 and 004. Such an acknowledgement message therefore has a dual purpose of positively acknowledging chunk 005 and negatively acknowledging chunks 003 and 004. If all data is successfully received, the acknowledgement message does not indicate missing data in field 1004.

This acknowledgement message is then transmitted by the server 104, and is received by the device 102, as part of processes 416 and 314 respectively. Upon receiving the acknowledgement message, the transmission status of the chunks can be updated accordingly. For example, the transmission statuses of chunks 001, 002 and 005 can be updated to indicate that the data has been positively acknowledged, and the transmission statuses of chunks 003 and 004 can be updated to indicate that the data was negatively acknowledged. Chunks 003 and 004 can therefore be retransmitted until they are positively acknowledged. In some examples chunks 001 and 002 may have been positively acknowledged by an earlier acknowledgement message (and may already have been deleted from the EDS buffers).

In a second example, assume that 10 chunks of data have been transmitted by the device 102. Chunks 001-005 have been successfully received and positively acknowledged. However, a threshold period of time has now elapsed since chunk 006 was sent without being positively or negatively acknowledged. In this period, chunks 007-010 were also transmitted, so none of chunks 006-010 have been positively or negatively acknowledged. This could be because chunks 006-010 were lost during transmission, or could be because the acknowledgement message(s) generated by the server 104 were lost during transmission to the device 102.

Because the device 102 cannot explicitly determine whether the chunks were received by the server 104, all data chunks 006-010 could be retransmitted. However, such a process would be an inefficient use of bandwidth if it transpires that several of these chunks were actually received. So, to avoid retransmitting all of chunks 006-010, the device 102 may retransmit the most recently transmitted chunk after the threshold period of time has elapsed. For example, the device 102 can retransmit chunk 010. If successfully received, the server 104 will generate and transmit a smart acknowledgement message to indicate that chunk 010 is the chunk with the highest sequence number that has been received (in field 1002), and to indicate any missing chunk sequence numbers (in field 1004). By retransmitting the chunk with the highest sequence number, the smart acknowledgement message indicates any lower sequence number data that is missing. For example, it may be that chunks 006, 007, 008 were all received, but the associated acknowledgement messages were lost. Accordingly, the subsequent smart acknowledgement message informs the device 102 that only chunk 009 is missing, and this can be transmitted. This procedure therefore avoids unnecessarily retransmitting excessive amounts of data when it may not be necessary.

As mentioned, the "threshold period of time" is the elapsed time since each chunk of data was last sent. So, in the above example, the process of retransmitting the most recently transmitted chunk (in this case chunk 010) occurs when it is determined that the time elapsed since any unacknowledged chunk was transmitted has exceeded a threshold (in this case chunk 006). This threshold may be user configurable.

In a third example, each type of data is associated with a different range of sequence numbers. In this example, assume that 10 chunks of data have been transmitted by the device 102. Five of these chunks are data of a data type that has a receipt requirement whereby the data is required to be received (such as a first type), and five of these chunks are data of a data type that does not have a receipt requirement (such as a second type). Data of the first type is associated with a first range of sequence numbers, such as 001-005. Data of the second type is associated with a second range of sequence numbers, such as 101-105.

In an example, the data is sent from the device 102 in the following order: 001, 002, 101, 102, 103, 003, 104, 004, 005, 105, however it will be appreciated that the data can be sent in any order. In this example, assume that chunks 003 and 102 are lost and are never received by the server 104. The server therefore receives chunks 001, 002, 004, 005 and chunks 101, 103, 104, 105. Accordingly, the server 104 can determine that a first chunk of data has not been received based on the first range of sequence numbers associated with the chunks of data it has received. For example, the server 104 can deduce that chunk 003 is missing. This may be determined at the point the server 104 receives a chunk of data out of sequence, or at any point in time after that. Similarly, the server 104 can determine that a second chunk of data has not been received based on the second range of sequence numbers associated with the chunks of data it has received. For example, the server 104 can deduce that chunk 102 is missing.

In addition, the server 104 can determine that the first chunk of missing data is data having a receipt requirement whereby the data is required to be received by the server 104. This can be determined based on the type of data of the chunks of data it has received. For example, the server 104 can determine that chunks 001, 002, 004, 005 are data of a data type that has a receipt requirement whereby the data is required to be received (such as a first type). The first chunk of missing data (chunk 003) must therefore also be of the same type. Similarly, the server 104 can determine that chunks 101, 103, 104, 105 are data of a data type that does not have a receipt requirement (such as a second type). The second chunk of missing data (chunk 102) must therefore also be of the same type. The server 104 can determine the type of data associated with the data that it has received by inspecting/parsing one or more of the received data chunks. For example, data may be formatted in accordance with the JavaScript Object Notation (JSON) syntax and a data string may indicate the particular type of data. In this way, the server 104 can determine whether or not the missing data is to be retransmitted. In some examples, if the server 104 determines that the chunk of data that has not been received is data having a receipt requirement whereby the data is required to be received, the server 104 can generate an acknowledgement message.

In certain examples, an acknowledgement message is sent for only data having a receipt requirement whereby the data is required to be received. In other examples, an acknowledgement message is also sent for data not having a receipt requirement, even though any missing data will not be retransmitted.

Figure 11:
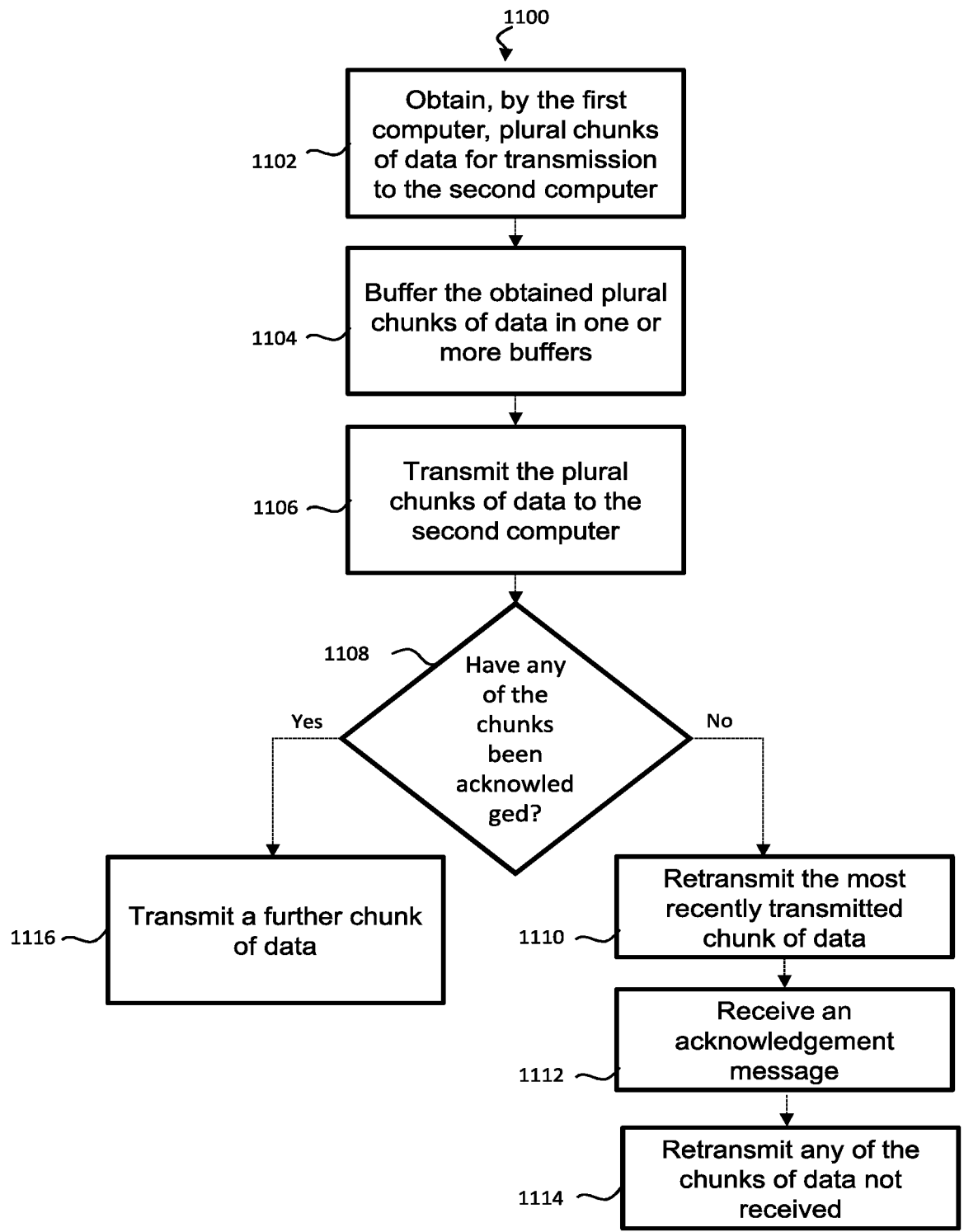
FIG. 11 is a flow diagram of a method of reducing bandwidth by retransmitting the most recently transmitted chunk of data according to an example.

FIG. 11 depicts a method 1100 of transmitting data between a first computer and a second computer.

In block 1102, the method comprises obtaining, by the first computer, plural chunks of data for transmission to the second computer, wherein the plural chunks of data have a receipt requirement whereby the data is required to be received by the second computer. In block 1104, the method comprises buffering the obtained plural chunks of data in one or more buffers. In block 1106, the method comprises transmitting the plural chunks of data to the second computer. In some examples, block 1106 further comprises, as each chunk of data is transmitted, initiating a separate timer. The timer runs until the chunk of data is either positively or negatively acknowledged by the second computer.

In block 1108, the method comprises determining whether the plural chunks of data have been acknowledged by the second computer within a threshold period of time. For example, if one of the timers, such as a timer associated with the chunk of data first transmitted, reaches a predefined threshold time, then it means that the chunk of data has not been either positively or negatively acknowledged by the second computer. Accordingly, block 1108 may involve determining that a timer, associated with a transmitted chunk of data, reaches the predefined threshold of time.

If the first computer determines that none of the plural chunks of data have been acknowledged by the second computer within the threshold period of time, the method comprises, in block 1110, retransmitting the most recently transmitted chunk of data of the plural chunks of data. If none of the chunks have been acknowledged, then none of the chunks have been positively or negatively acknowledged. Accordingly, in this threshold period of time, plural chunks of data have been transmitted, but none have been positively or negatively acknowledged.

After retransmitting the most recently transmitted chunk of data of the plural chunks of data, the method may comprise, in block 1112, receiving a smart acknowledgement message from the second computer, wherein the acknowledgement message indicates that the retransmitted chunk of data has been received by the second computer and that at least one further chunk of data of the plural chunks of data has not been received. The method may then comprise, in block 1114, retransmitting the at least one further chunk of data.

If the first computer determines, in block 1108, that at least one of the plural chunks of data has been acknowledged as received by the second computer within the threshold period of time, the method comprises, in block 1116, transmitting a further chunk of data and, if required, retransmitting any chunks of data of the plural chunks of data. For example, the first computer may receive a smart acknowledgement message indicating that at least one of the plural chunks of data has been received by the second computer and the acknowledgement message may further indicate whether any chunks of data of the plural chunks of data were not received by the second computer. Accordingly, the first computer can retransmit those chunks not received and can continue sending data as normal.

Bandwidth Measurement

Figure 12:
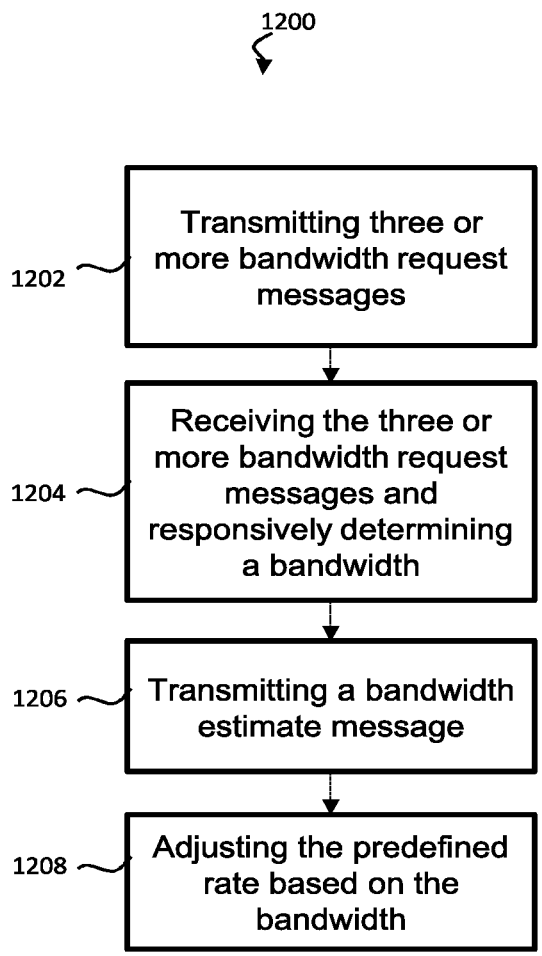
FIG. 12 is a flow diagram of a method of measuring a connection bandwidth according to an example.

As mentioned above, the rate at which data is sent to the server 104 can be varied dependent upon the bandwidth of the connection between the device 102 and the server 104. For example, the predefined rate at which the data is placed into the Master Buffer 702, and/or the Transmission Window Size variable can be increased/decreased depending upon the bandwidth. FIG. 12 is a flow diagram showing a method 1200 of performing a bandwidth measurement. In block 1202, the method comprises transmitting, to the server 104, three or more bandwidth request messages. Accordingly, each of these messages are transmitted in sequence, with negligible delay. Message #1 is transmitted first, followed by Message #2 and Message #3, for example. These three messages are each of the same size (for example, they may have a size equal to the Maximum Chunk Size). In block 1204, the method comprises receiving, by the server 104, the three or more bandwidth request messages and responsively determining a bandwidth of a connection between the device 102 and the server 104. The bandwidth may be determined by monitoring the time at which the messages were received, and calculating the following variables:

$T1$(seconds)=Message #2 reception time−Message #1 reception time $T2$(seconds)=Message #3 reception time−Message #2 reception time Average Delay (seconds)=$(T1+T2)/2$ Bandwidth (kilobits per second)=Message Size (kilobits)/Average Delay Accordingly, the bandwidth can be determined. At block 1206 the method comprises transmitting, by the server 104 to the device 102, a bandwidth estimate message, the bandwidth estimate message indicating the bandwidth determined by the server 104. In some examples the bandwidth estimate message also indicates if the difference between T1 and T2 exceeds a threshold. For example, the threshold may be 10%, 20%, 25% etc. This indicates how variable the delay calculations were. If it exceeds a threshold, it may be determined that the bandwidth is highly variable. If deemed highly variable, another set of bandwidth request messages may be sent at a later time to more accurately determine the bandwidth.

At block 1208 the method comprises adjusting, by the device 102, the predefined rate based on the bandwidth determined by the server 104. In other words, the rate at which data is placed into the Master Buffer 702 can be altered depending upon the measured bandwidth. For example, if the bandwidth increases, the predefined rate can be increased (meaning that a higher volume of data (measured in bits) is placed into the master buffer per second).

Alternatively, block 1208 may comprise adjusting, based on the bandwidth, the volume of data which can be sent without requiring acknowledgement. In other words, the Transmission Window Size variable can be increased depending upon the measured bandwidth. For example, if the bandwidth increases, the Transmission Window Size variable can be increased to allow a greater number of data chunks to be sent.

Device Discovery and Socket Type Discovery

In some situations, the device 102 and the server 104 are located on the same local area network (LAN) and the server 104 can have a dynamically assigned network address (such as an IP address). In this situation, the device 102 cannot be pre-configured with the server's IP address. Accordingly, the device 102 can use a discovery procedure to find the IP address of the server 104. If the device 102 is configured with a server's static IP address, this discovery procedure can be omitted.

The discovery procedure comprises sending, by the device 102 to all computers in the LAN, a broadcast message. For example, the broadcast message can be sent as a UDP broadcast on a configured UDP port. The broadcast message may include information identifying the device 102, such as a unique serial number. The broadcast message will be received by the server 104, and the server will send a response message. The device 102 therefore receives the response message from the server 104, and the response message indicates at least a network address of the server 104 (such as an IP address). A network address of the responding server 104 may be contained within the response message payload, or it may be determined by inspecting the sender network address of the UDP packet. In some examples, the response message may also include information identifying the device 102, such as a unique serial number. Accordingly, the network address of the server 104 can be determined.

In certain examples the response message further indicates a security setting used by the server 104. A security setting indicates whether the server 104 is running an unencrypted UDP socket or an encrypted UDP socket for example. The security setting can be inferred by the nature of the response message. For example, if the device 102 and server 104 are running unencrypted UDP sockets, the server 104 will be able to process the message and responsively reply with a message indicating its network address. However, if the device 102 is running an unencrypted UDP socket, and the server 104 is running an encrypted DTLS socket, the server 104 will reject the message and so will respond with a DTLS Reject message. In this case, the device 102 will determine the network address by checking the sender IP address of the DTLS Reject message.

Accordingly, the response message type can be used to infer a security setting of the server 104. In other words, the response message indicates whether the server 104 is running encrypted or unencrypted UDP sockets. Once the security setting is known, future data can be transmitted to the server 104 in accordance with the security setting. For example, if it is determined that the server 104 is running DTLS UDP sockets, the export process 310 can establish DTLS UDP sockets. Similarly, if it is determined that the server 104 is running "plain" unencrypted UDP sockets, the export process 310 can establish unencrypted UDP sockets.

In some examples, a network address of the server 104 is already known. However, it may still be important to determine a security setting used by the server 104. Accordingly, rather than sending a broadcast message, a probe message can be sent to the server using a preconfigured network address of the server 104. For example, the network address of the server 104 may already be stored in memory of the device 102. Once received by the server 104, the server 104 responds with a response message. As above, this response message can indicate a security setting used by the server 104. For example, if the device 102 and server 104 are running unencrypted UDP sockets, the server 104 will be able to process the message and responsively reply with an acknowledgement message. However, if the device 102 is running unencrypted UDP sockets, and the server 104 is running an encrypted DTLS socket, the server 104 will reject the message and so will respond with a DTLS Reject message. So, in the same way as described above, the response message can be used to infer a security setting of the server 104.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of transmitting data between a first computer and a second computer, the method comprising:
    obtaining, by the first computer, data for transmission to the second computer, the data comprising at least first data and second data, the first data being of a first type of data and the second data being of a second type of data, each type of data having an associated transmission priority, and the first type of data having a receipt requirement whereby the data is required to be received by the second computer and the second type of data not having a receipt requirement;
    buffering the obtained data in one or more buffers;
    reading the data from the one or more buffers and transmitting the data to the second computer according to the transmission priorities; and
    for only transmitted data having a receipt requirement whereby the data is required to be received by the second computer, determining, by the first computer by reference to an expected acknowledgement message from the second computer, whether the transmitted data has been received by the second computer and, if it is determined not to have been received, retransmitting the data to the second computer,
    wherein the method comprises:
    obtaining, by the first computer, third data, the third data being of the first type of data;
    buffering the third data in the one or more buffers; and
    in response to determining that the first data was not received by the second computer:
        updating the transmission priority of the first data to a level that is higher than that of the third data; and retransmitting the first data to the second computer before transmitting the third data to the second computer.

2. The method according to claim 1, further comprising:
for data having a receipt requirement whereby the data is required to be received by the second computer:
determining that plural elements of data have not been acknowledged by the second computer within a threshold period of time; and
retransmitting the most recently transmitted element of data of the plural elements of data.

3. The method according to claim 1, further comprising:
for data having a receipt requirement whereby the data is required to be received by the second computer:
sending, by the second computer to the first computer, an acknowledgement message associated with the data.

4. The method according to claim 3, further comprising:
receiving, from the first computer, an element of data;
determining, by the second computer, that at least one element of data has not been received, wherein the at least one element of data was transmitted before the element of data was transmitted; and
transmitting, to the first computer, an acknowledgement message comprising:
an indication that the element of data has been received; and
an indication that the at least one element of data has not been received.

5. The method according to claim 4, wherein elements of data are associated with sequence numbers, and wherein:
the indication that the element of data has been received comprises an indication of a sequence number associated with the element of data; and
the indication that the at least one element of data has not been received comprises an indication of sequence numbers associated with the at least one elements of data.

6. The method according to claim 5, further comprising:
storing, by the first computer:
a list of sequence numbers associated with data being of a type having a receipt requirement whereby the data is required to be received by the second computer; and
for each sequence number in the list of sequence numbers, an associated transmission status of the data.

7. The method according to claim 6, wherein the associated transmission statuses each indicate, one of:
that the data has not been sent by the first computer;
that the data has been sent by the first computer;
that the data has been sent by the first computer, and has been negatively acknowledged by the second computer; and
that the data has been sent by the first computer, and has been positively acknowledged as being received by the second computer.

8. The method according to claim 5, further comprising:
storing, by the first computer:
a list of sequence numbers associated with data being of the type not having a receipt requirement; and
for each sequence number in the list of sequence numbers, an associated transmission status of the data.

9. The method according to claim 8, wherein the associated transmission statuses each indicate, one of:
that the data has not been sent by the first computer; and
that the data has been sent by the first computer.

10. The method according to claim 1, wherein each type of data is associated with a different range of sequence numbers.

11. The method according to claim 10, wherein the method further comprises:
receiving, from the first computer, plural elements of data, wherein the plural elements of data:
are a type of data that has a receipt requirement whereby the data is required to be received by the second computer; and
are associated with a range of sequence numbers; and
determining, by the second computer:
that an element of data has not been received based on the range of sequence numbers associated with the plural elements of data; and
that the element of data that has not been received is data having a receipt requirement whereby the data is required to be received by the second computer, based on the type of data of the plural elements of data.

12. The method according to claim 1, further comprising:
obtaining, by the first computer, fourth data, the fourth data being of a third type of data not having a receipt requirement and having a transmission priority that is the same as a transmission priority associated with the first data;
buffering the fourth data in the one or more buffers; and
transmitting the fourth data to the second computer before transmitting the first data.

13. The method according to claim 1, wherein the one or more buffers comprise a buffer for each type of data obtained by the first computer, the buffers each having a transmission priority corresponding to that of the type of data being buffered in the buffer.

14. The method according to claim 1, wherein transmitting the data to the second computer comprises transmitting the data via a single network socket.

15. The method according to claim 1, wherein transmitting the data to the second computer comprises transmitting the data via a UDP socket.

16. The method according to claim 1, wherein:
reading the data from the one or more buffers comprises reading the data from the one or more buffers into a master buffer before transmitting the data from the master buffer to the second computer.

17. The method according to claim 16, wherein elements of data are read into the master buffer at a predefined rate.

18. The method according to claim 17, further comprising:
transmitting, to the second computer, three or more bandwidth request messages;
receiving, by the second computer, the three or more bandwidth request messages and responsively determining a bandwidth of a connection between the first computer and the second computer;
transmitting, by the second computer to the first computer, a bandwidth estimate message, the bandwidth estimate message indicating the bandwidth determined by the second computer; and
at least one of:
adjusting, by the first computer, the predefined rate based on the bandwidth determined by the second computer; and
adjusting, by the first computer, a threshold number of data elements that can be transmitted to the second computer without requiring acknowledgement.

19. The method according to claim 16, further comprising:
reading the data from the master buffer and forming a data packet having a payload, the payload comprising the first data and the second data; and transmitting the data to the second computer comprises transmitting the data packet to the second computer.

20. The method according to claim 16, further comprising:
after reading the data from the one or more buffers into the master buffer:
for data not having a receipt requirement, removing data from the one or more buffers; and
for data having a receipt requirement whereby the data is required to be received by the second computer, retaining data in the one or more buffers until it is determined that the transmitted data has been received by the second computer.

21. The method according to claim 1, further comprising, before transmitting the first data and the second data:
sending, by the first computer to all computers in a local area network, a broadcast message;
receiving, by the first computer, a response message from the second computer, the response message indicating at least:
a network address of the second computer; and
a security setting used by the second computer;
wherein the first computer transmits data to the second computer in accordance with the security setting.

22. The method according to claim 1, further comprising, before transmitting the first data and the second data:
sending, by the first computer, a probe message to the second computer using a preconfigured network address of the second computer;
receiving, by the first computer, a response message from the second computer, the response message indicating:
a security setting used by the second computer;
wherein the first computer transmits data to the second computer in accordance with the security setting.

23. A system comprising at least a first computer and a second computer, the first computer comprising:
memory; and
at least one processor configured to:
obtain data for transmission to the second computer, the data comprising at least first data and second data, the first data being of a first type of data and the second data being of a second type of data, each type of data having an associated transmission priority, and the first type of data having a receipt requirement whereby the data is required to be received by the second computer and the second type of data not having a receipt requirement;
buffer the obtained data in one or more buffers;
read the data from the one or more buffers and transmitting the data to the second computer according to the transmission priorities; and
for only transmitted data having a receipt requirement whereby the data is required to be received by the second computer, determine, by reference to an expected acknowledgement message from the second computer, whether the transmitted data has been received by the second computer and, if it is determined not to have been received, retransmit the data to the second computer obtain third data, the third data being of the first type of data;
buffer the third data in the one or more buffers; and
in response to determining that the first data was not received by the second computer:
update the transmission priority of the first data to a level that is higher than that of the third data; and
retransmit the first data to the second computer before transmitting the third data to the second computer.

24. A system comprising a first computer and a second computer,
wherein the first computer comprises:
first memory; and
a first processor configured to:
obtain data for transmission to the second computer, the data comprising at least first data and second data, the first data being of a first type of data and the second data being of a second type of data, each type of data having an associated transmission priority, and the first type of data having a receipt requirement whereby the data is required to be received by the second computer and the second type of data not having a receipt requirement;
buffer the obtained data in one or more buffers;
read the data from the one or more buffers and transmitting the data to the second computer according to the transmission priorities; and
for only transmitted data having a receipt requirement whereby the data is required to be received by the second computer, determine, by reference to an expected acknowledgement message from the second computer, whether the transmitted data has been received by the second computer and, if it is determined not to have been received, retransmit the data to the second computer;
obtain third data, the third data being of the first type of data;
buffer the third data in the one or more buffers; and
in response to determining that the first data was not received by the second computer:
update the transmission priority of the first data to a level that is higher than that of the third data; and
retransmit the first data to the second computer before transmitting the third data to the second computer
wherein the second computer comprises:
second memory; and
a second processor configured to:
receive, from the first computer, an element of data; and
for data having a receipt requirement whereby the data is required to be received by the second computer:
transmit, to the first computer, an acknowledgement message comprising an indication that the element of data has been received.

25. The system according to claim 24, wherein the second processor is further configured to:
determine that at least one element of data has not been received, wherein the at least one element of data was transmitted, by the first computer, before the element of data was transmitted by the first computer; and
transmit, to the first computer, the acknowledgement message comprising:
an indication that the at least one element of data has not been received.

* * * * *